(12) United States Patent
Ang

(10) Patent No.: US 11,819,175 B2
(45) Date of Patent: Nov. 21, 2023

(54) DISH WASHING APPARATUS AND DISH DRYING APPARATUS

(71) Applicants: Teoh Hwa Ang, Singapore (SG); BLOSH CO. PTE. LTD., Singapore (SG)

(72) Inventor: Teoh Hwa Ang, Singapore (SG)

(73) Assignees: Ang Teoh Hwa, Singapore (SG); BLOSH CO., PTE, LTD., Singapore (SG)

(*) Notice: Subject to any disclaimer, the term of this patent is extended or adjusted under 35 U.S.C. 154(b) by 280 days.

(21) Appl. No.: 16/648,508

(22) PCT Filed: Sep. 18, 2018

(86) PCT No.: PCT/SG2018/050474
§ 371 (c)(1),
(2) Date: Mar. 18, 2020

(87) PCT Pub. No.: WO2019/059844
PCT Pub. Date: Mar. 28, 2019

(65) Prior Publication Data
US 2020/0281436 A1    Sep. 10, 2020

(30) Foreign Application Priority Data
Sep. 20, 2017    (SG) .................... 10201707766S

(51) Int. Cl.
*A47L 15/24*    (2006.01)
*A47L 15/00*    (2006.01)
(Continued)

(52) U.S. Cl.
CPC ......... *A47L 15/0076* (2013.01); *A47L 15/245* (2013.01); *A47L 15/248* (2013.01);
(Continued)

(58) Field of Classification Search
CPC .. A47L 15/0076; A47L 15/245; A47L 15/248; A47L 15/4295; A47L 15/4297;
(Continued)

(56) References Cited

U.S. PATENT DOCUMENTS 1,354,049 A * 9/1920 Linton .................. A47L 15/245
                                                               134/68
2,232,803 A * 2/1941 Rodda
(Continued)

FOREIGN PATENT DOCUMENTS

JP    10-323314        * 12/1998
JP    H1119020 A    *  1/1999    ............. A47L 15/24
(Continued)

OTHER PUBLICATIONS

International Search Report for PCT/SG2018/050474, dated Nov. 5, 2018, 4 pages.*

*Primary Examiner* — Joseph L. Perrin
*Assistant Examiner* — Irina Graf
(74) *Attorney, Agent, or Firm* — Nixon & Vanderhye, P.C.

(57) ABSTRACT

Dishwashing and dish drying apparatus are disclosed. The apparatus comprises three parallel rods which each have a screw thread on an outer surface. In use, the screw thread on each rod engages with a rim or lip of a dish and when the rods are rotated the dish is caused to move through the apparatus. This allows the whole of the dish to be exposed to a liquid in the dishwashing apparatus or to an air flow in a dish drying apparatus.

16 Claims, 26 Drawing Sheets

(51) Int. Cl.
*A47L 15/42* (2006.01)
*A47L 15/48* (2006.01)
*A47L 15/50* (2006.01)
*B25J 11/00* (2006.01)
*B25J 15/00* (2006.01)
*B65G 33/06* (2006.01)
*B65G 41/00* (2006.01)
*B65G 47/90* (2006.01)

(52) U.S. Cl.
CPC ....... *A47L 15/4295* (2013.01); *A47L 15/4297* (2013.01); *A47L 15/486* (2013.01); *A47L 15/501* (2013.01); *B25J 11/0085* (2013.01); *B25J 15/00* (2013.01); *B65G 33/06* (2013.01); *B65G 41/001* (2013.01); *B65G 47/90* (2013.01); *A47L 2401/04* (2013.01); *B65G 2201/022* (2013.01); *B65G 2203/0233* (2013.01); *B65G 2203/042* (2013.01)

(58) Field of Classification Search
CPC .. A47L 15/486; A47L 15/501; A47L 2401/04; B65G 33/06; B65G 41/001; B65G 47/90; B65G 2201/022; B25J 11/0085
See application file for complete search history.

(56) References Cited

U.S. PATENT DOCUMENTS

| | | | |
|---|---|---|---|
| 6,585,119 B2 * | 7/2003 | Palder | |
| 2010/0043834 A1 * | 2/2010 | Scheringer | ............ A47L 15/241 |
| | | | 134/25.2 |
| 2012/0180820 A1 * | 7/2012 | Hong | |
| 2013/0247940 A1 * | 9/2013 | Padtberg et al. | |

FOREIGN PATENT DOCUMENTS

| | | | | |
|---|---|---|---|---|
| TW | 200944173 | * | 11/2009 | |
| WO | WO-2012173479 A1 | * | 12/2012 | ........... A47L 15/241 |
| WO | WO-2013138173 A1 | * | 9/2013 | ......... A47L 15/0092 |

* cited by examiner

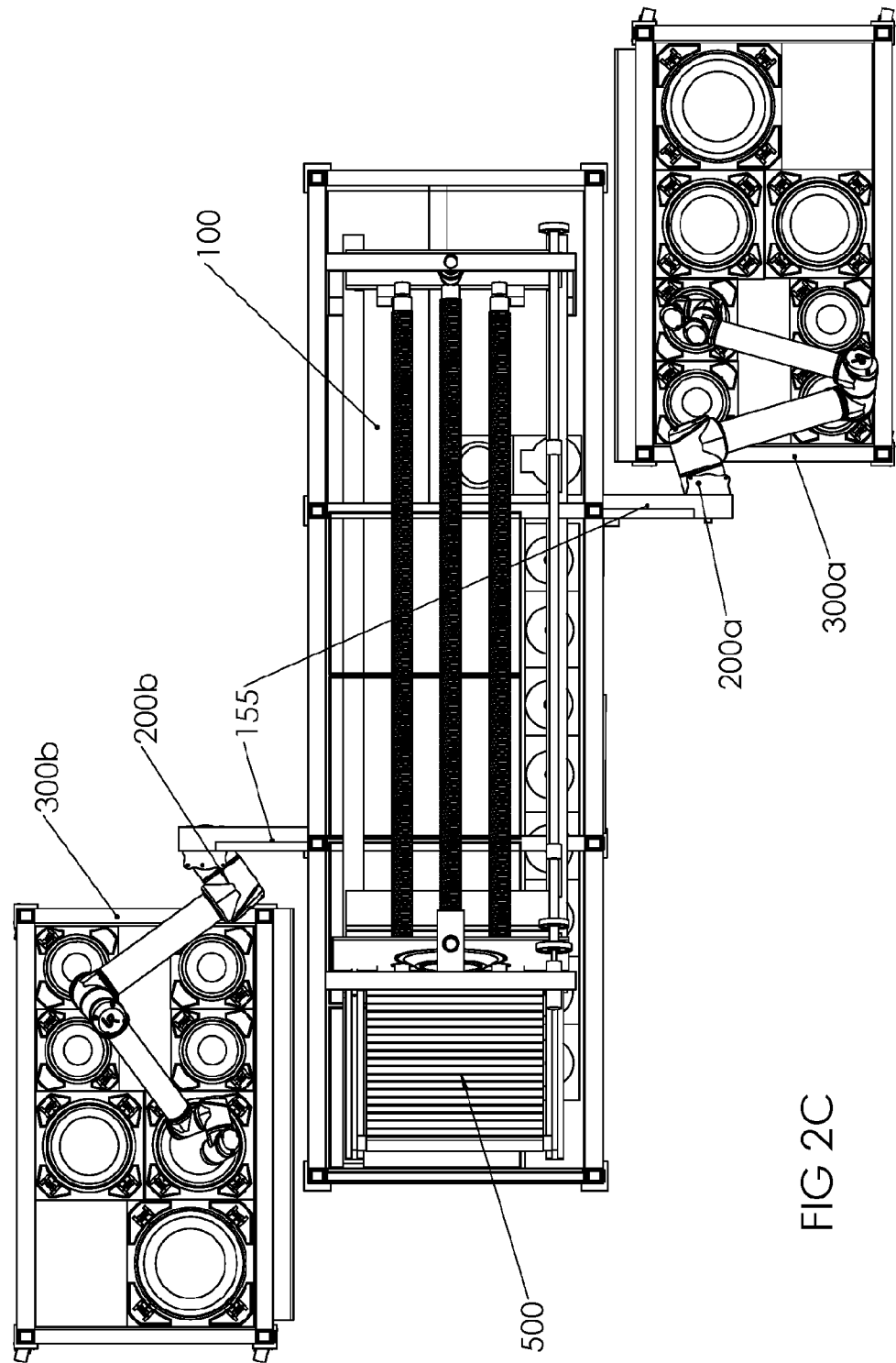

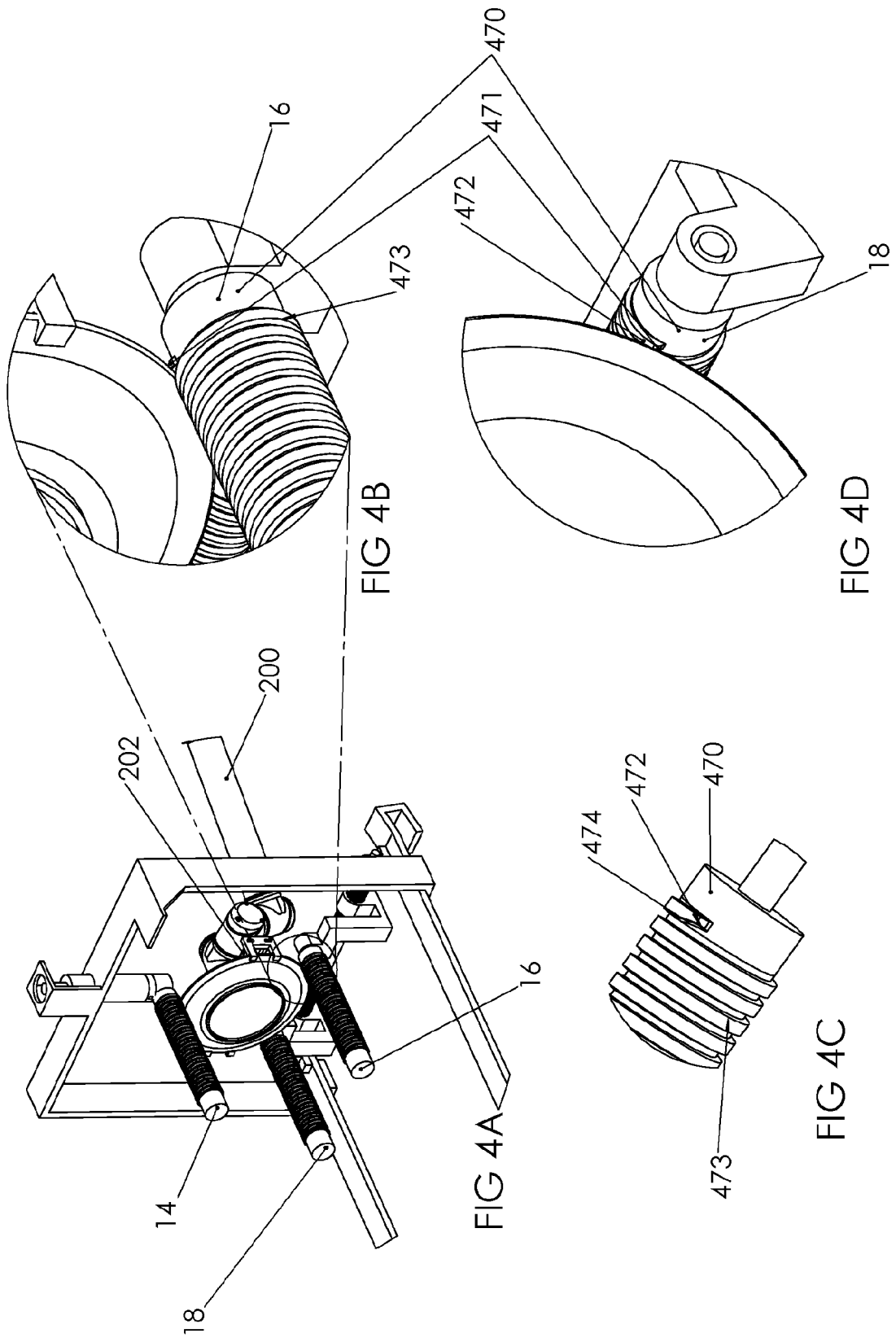

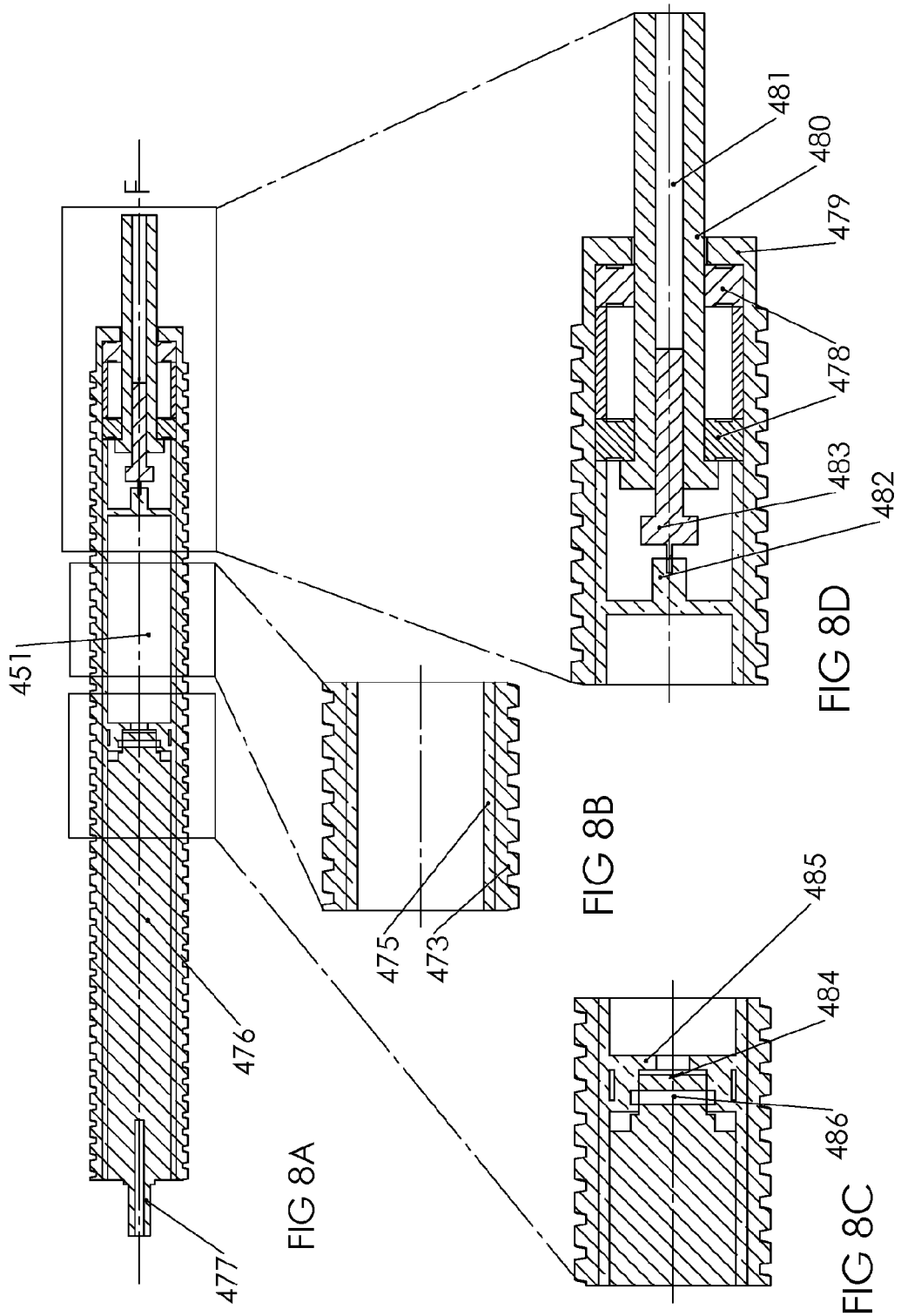

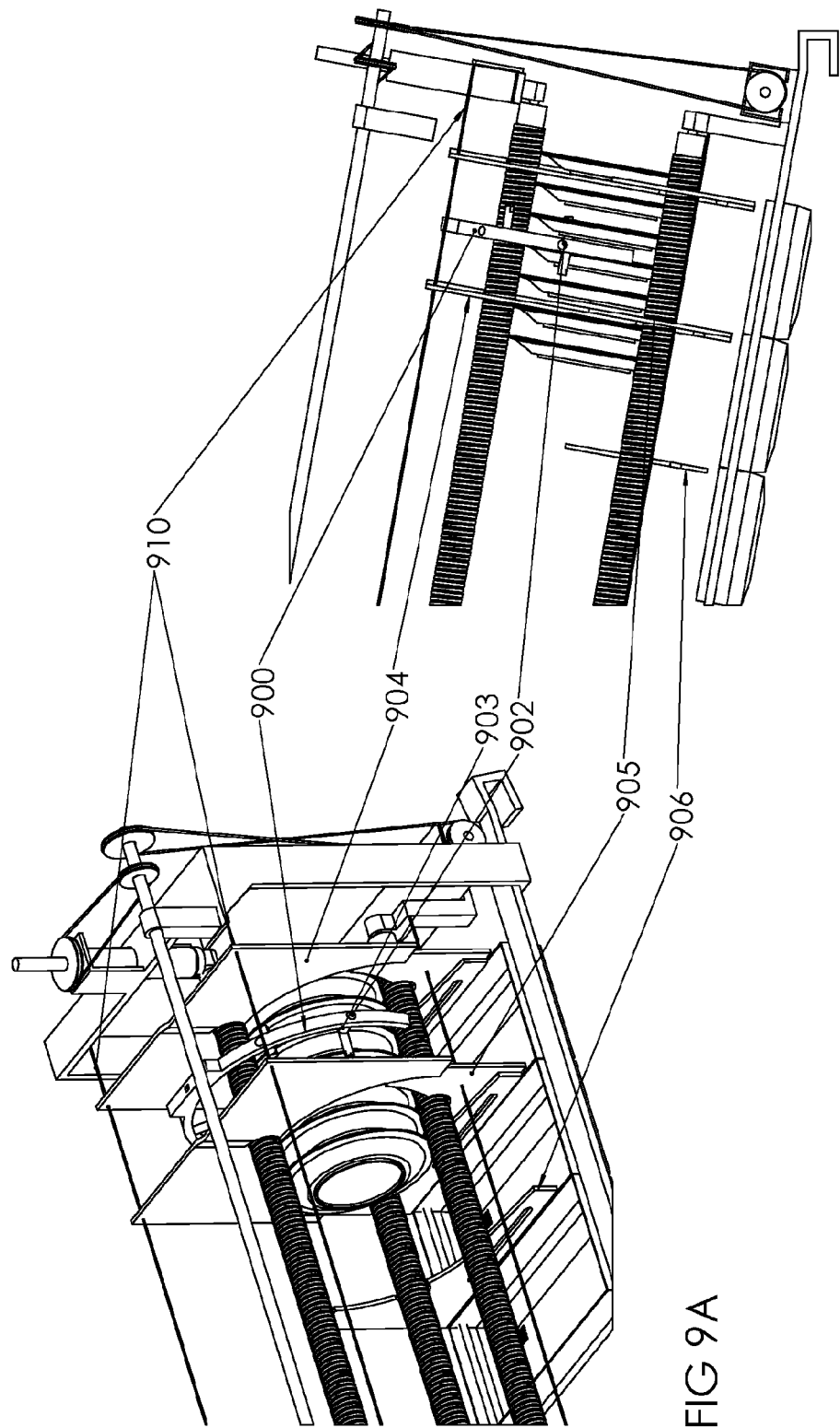

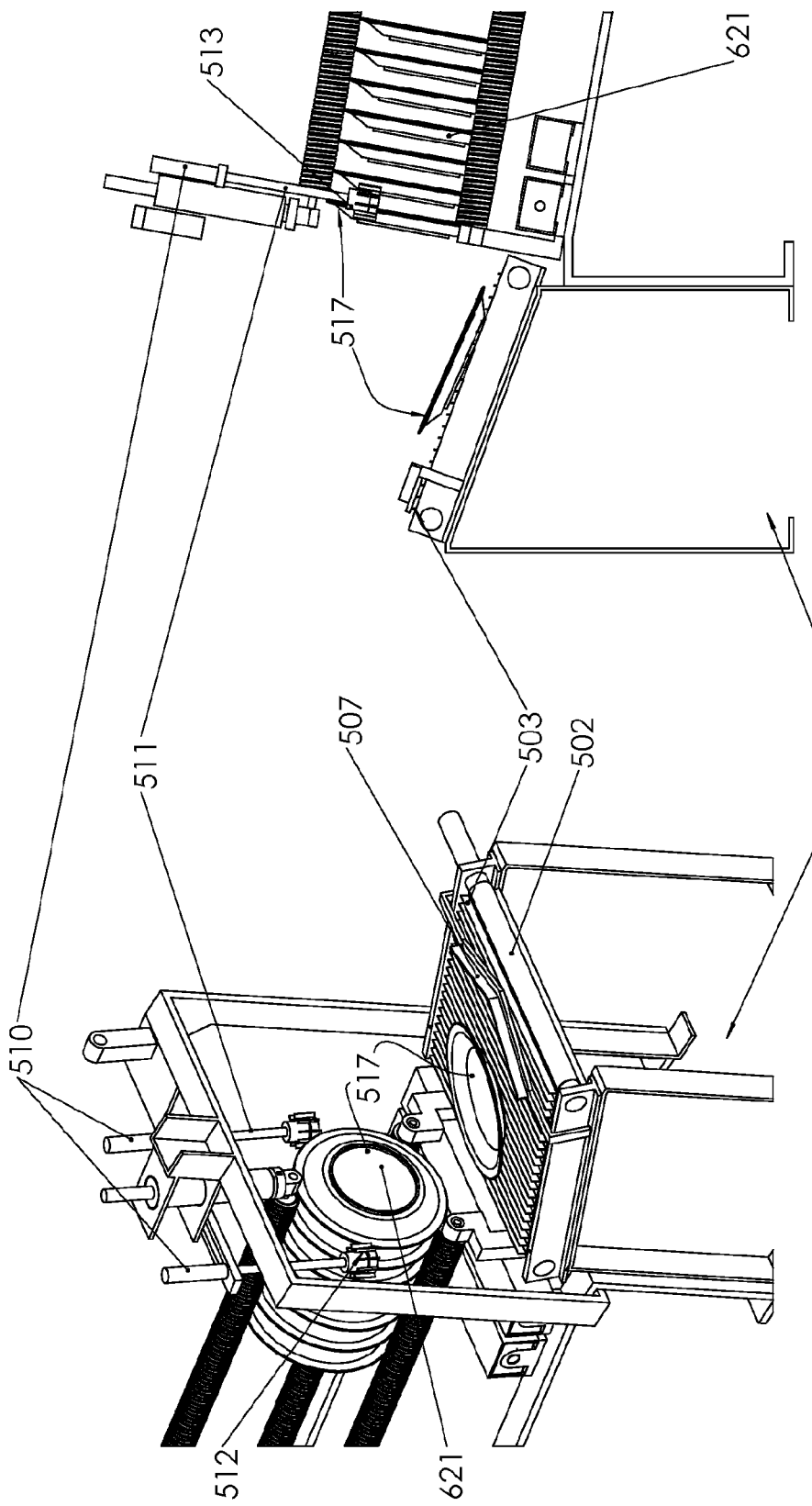

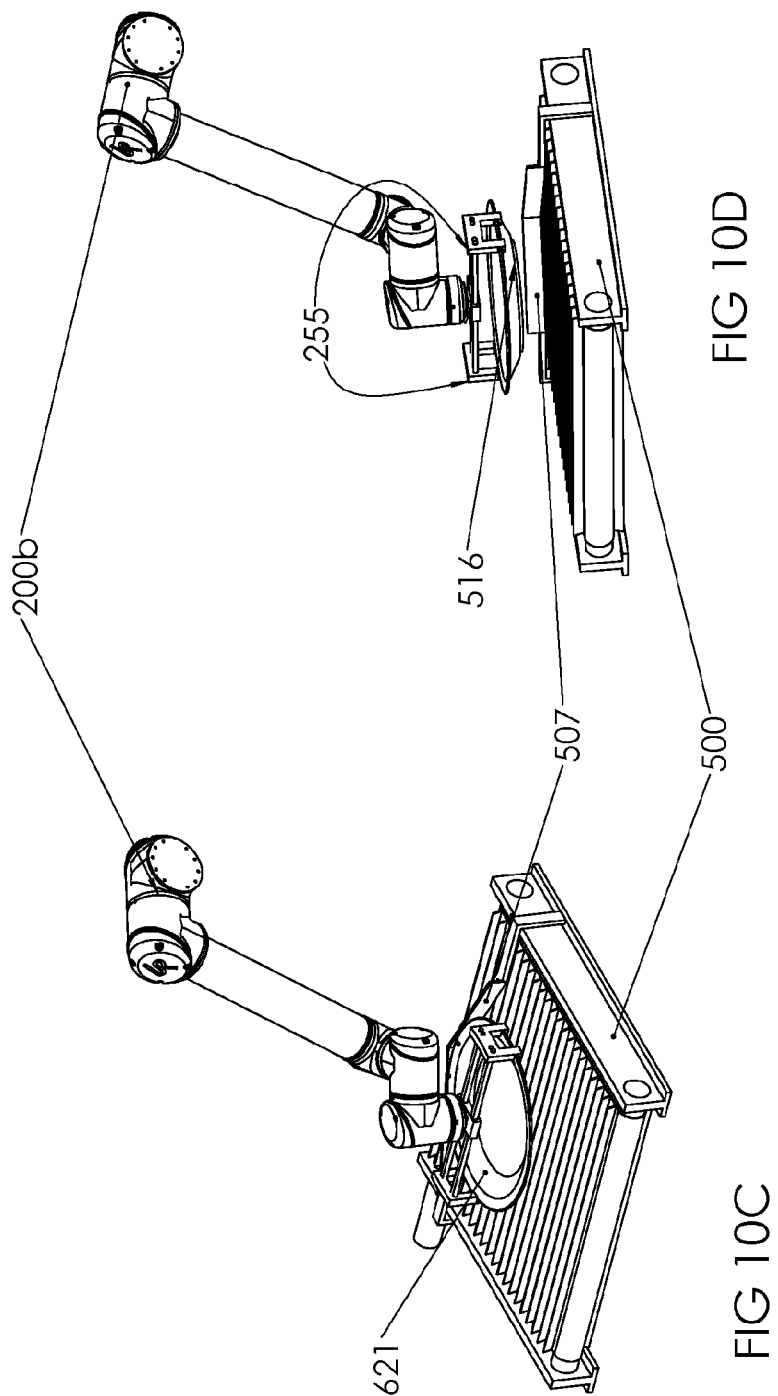

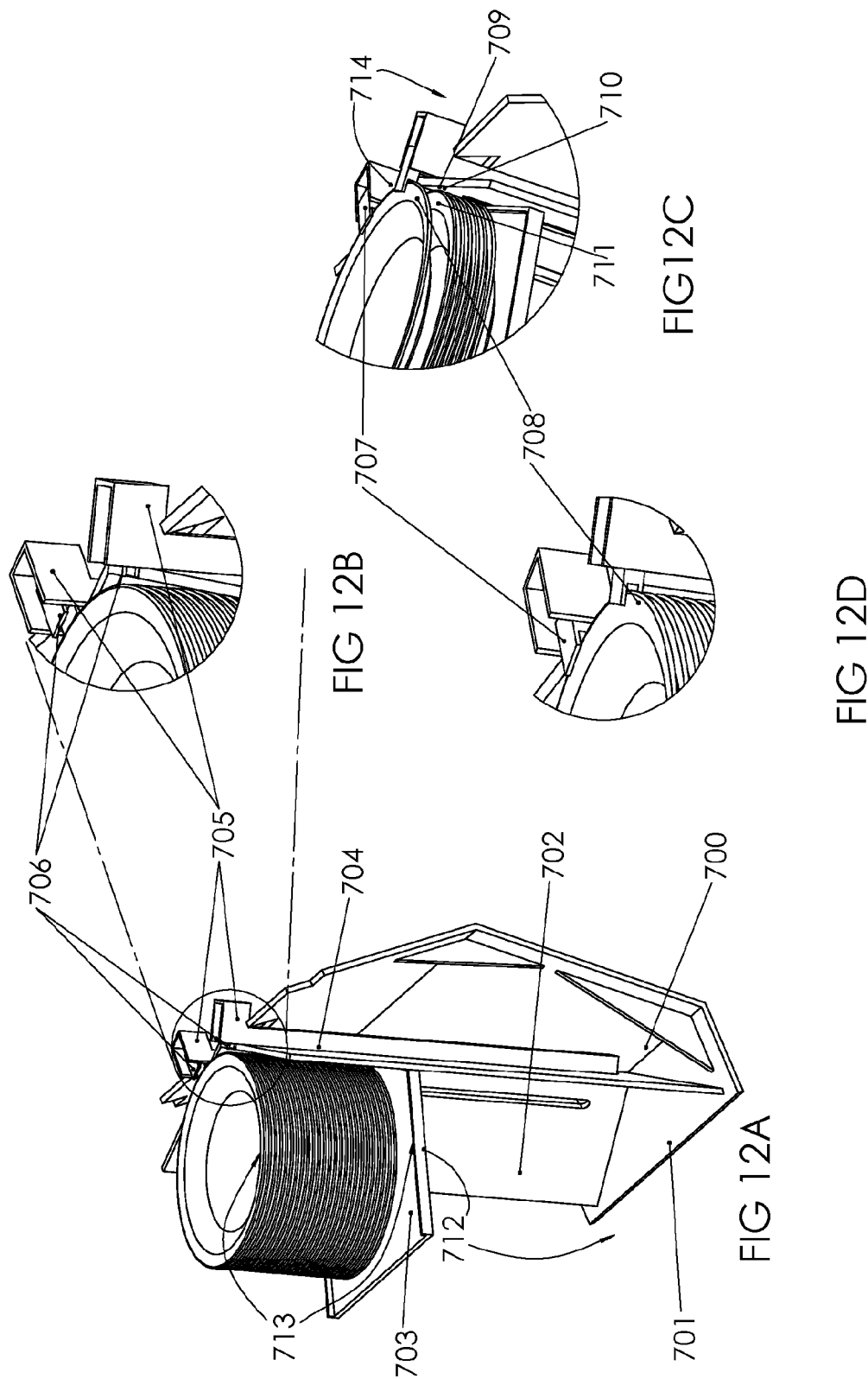

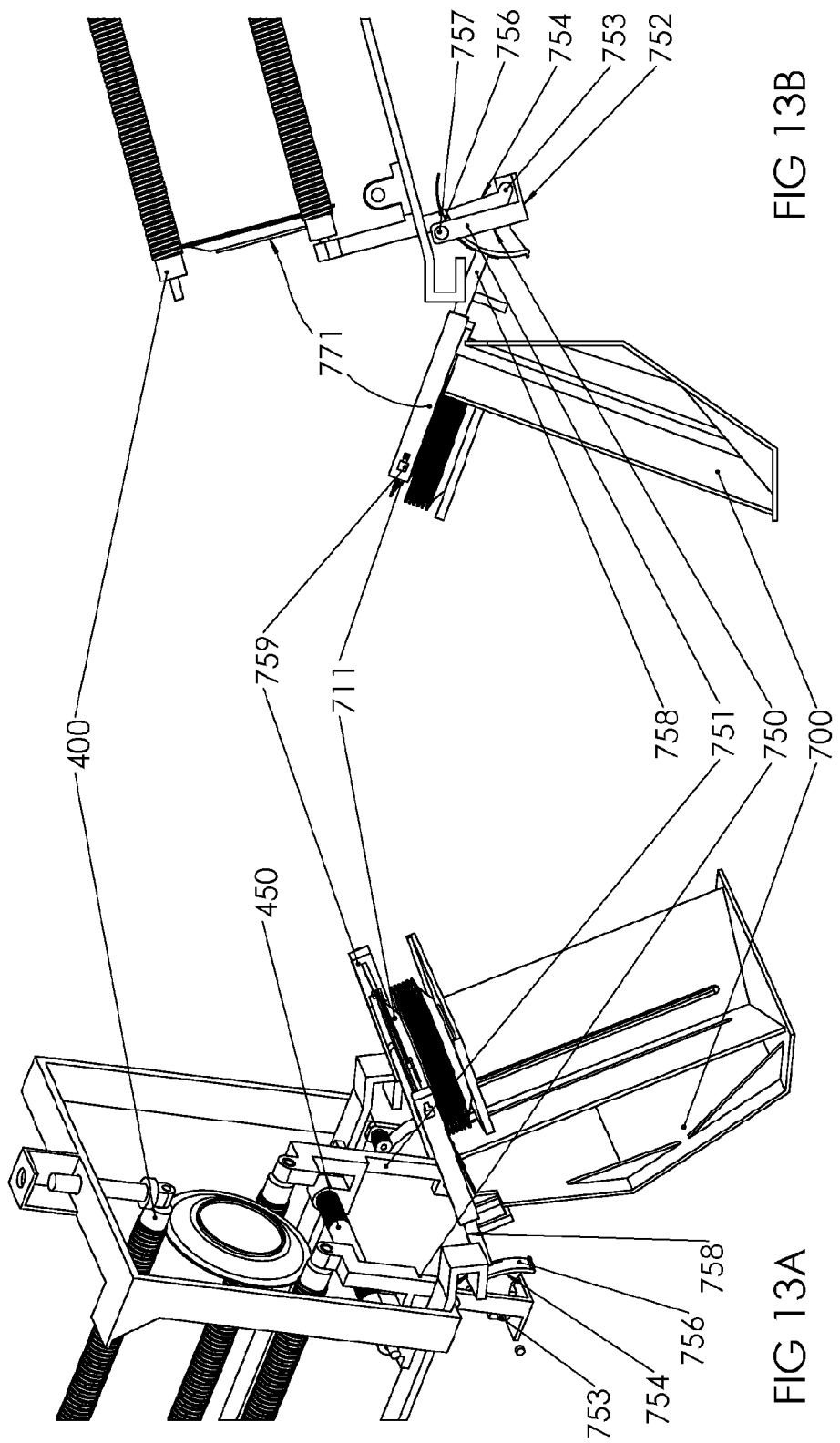

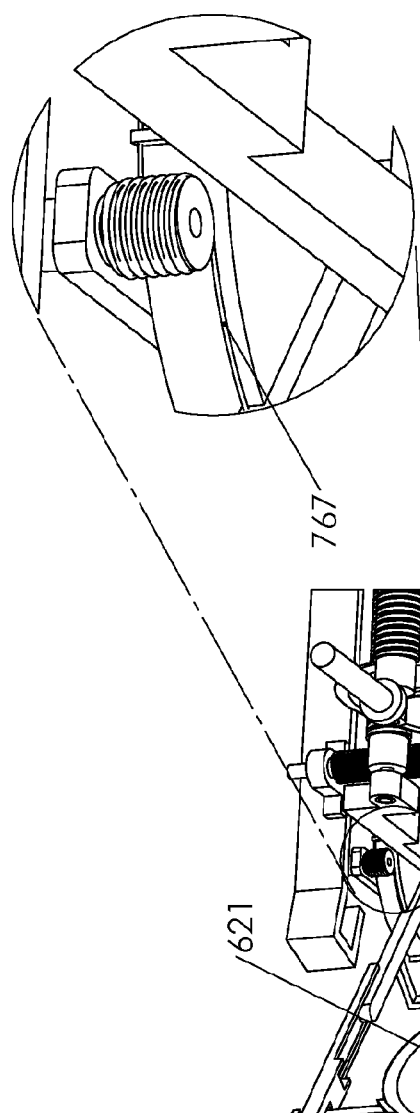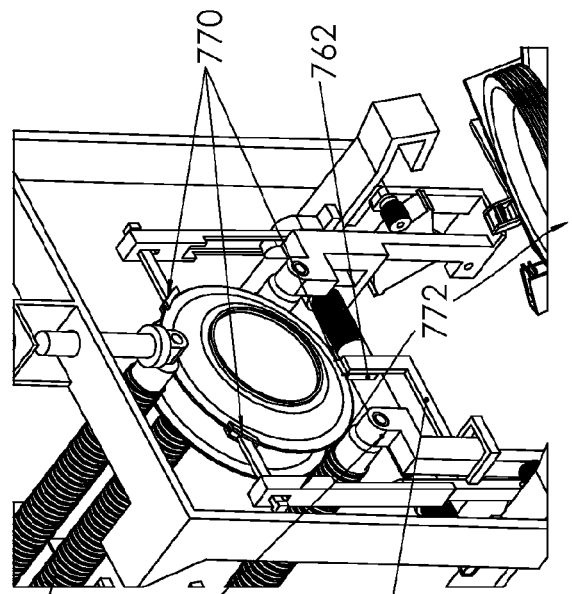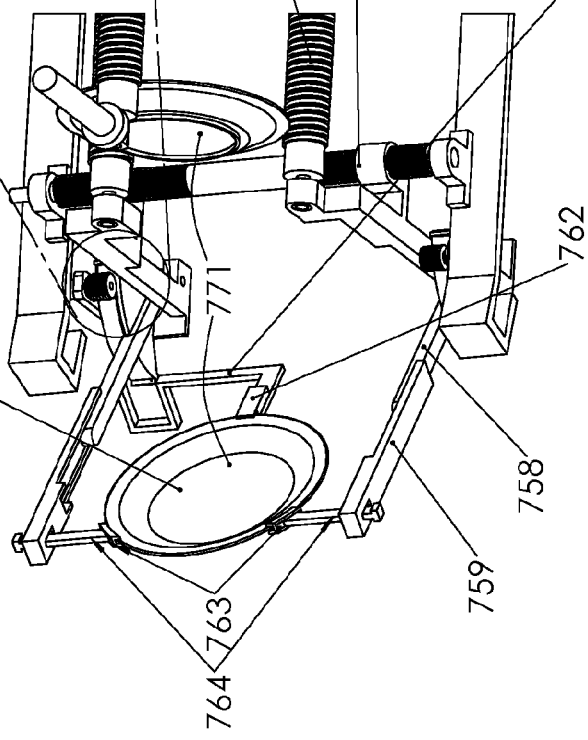

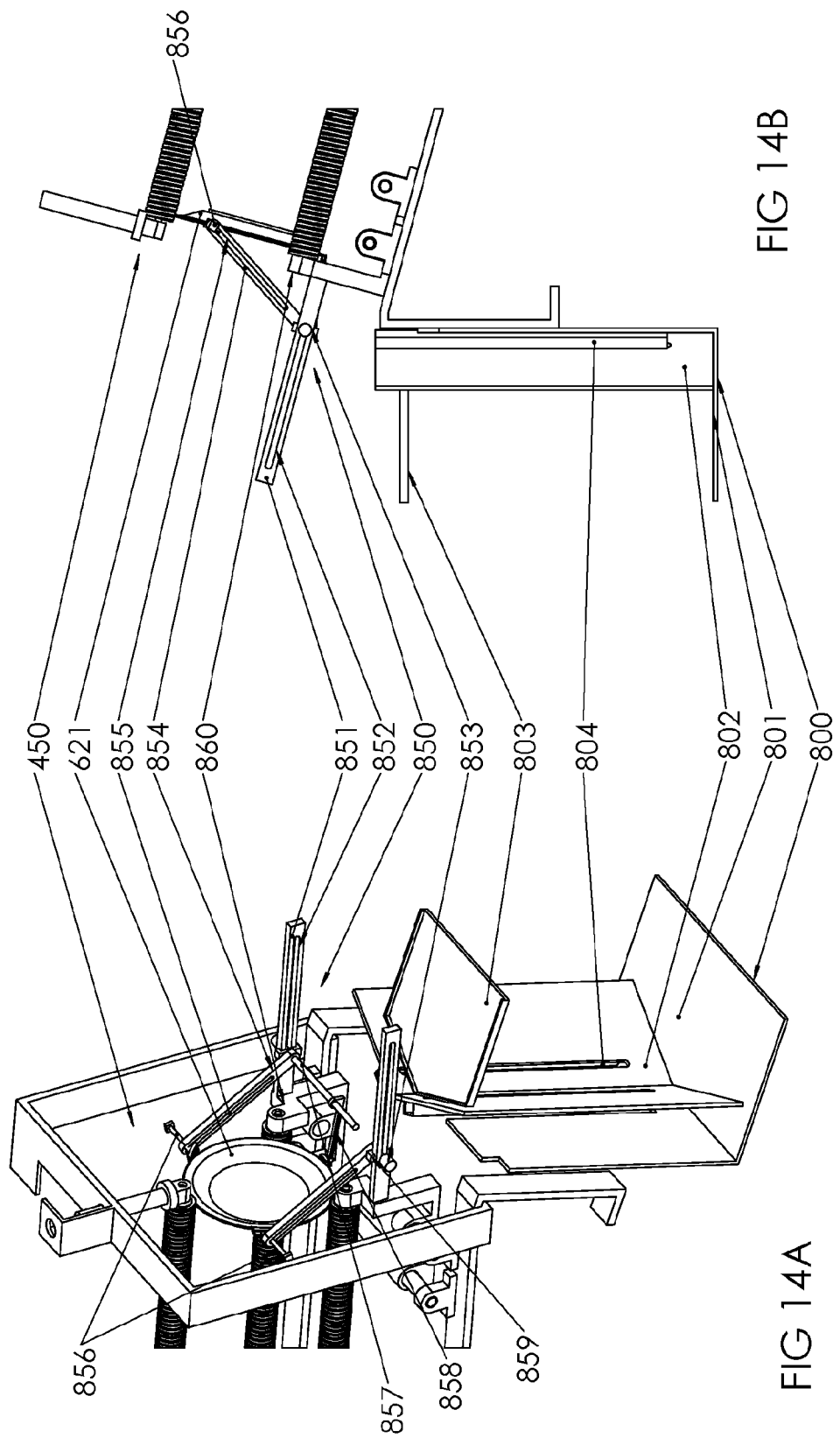

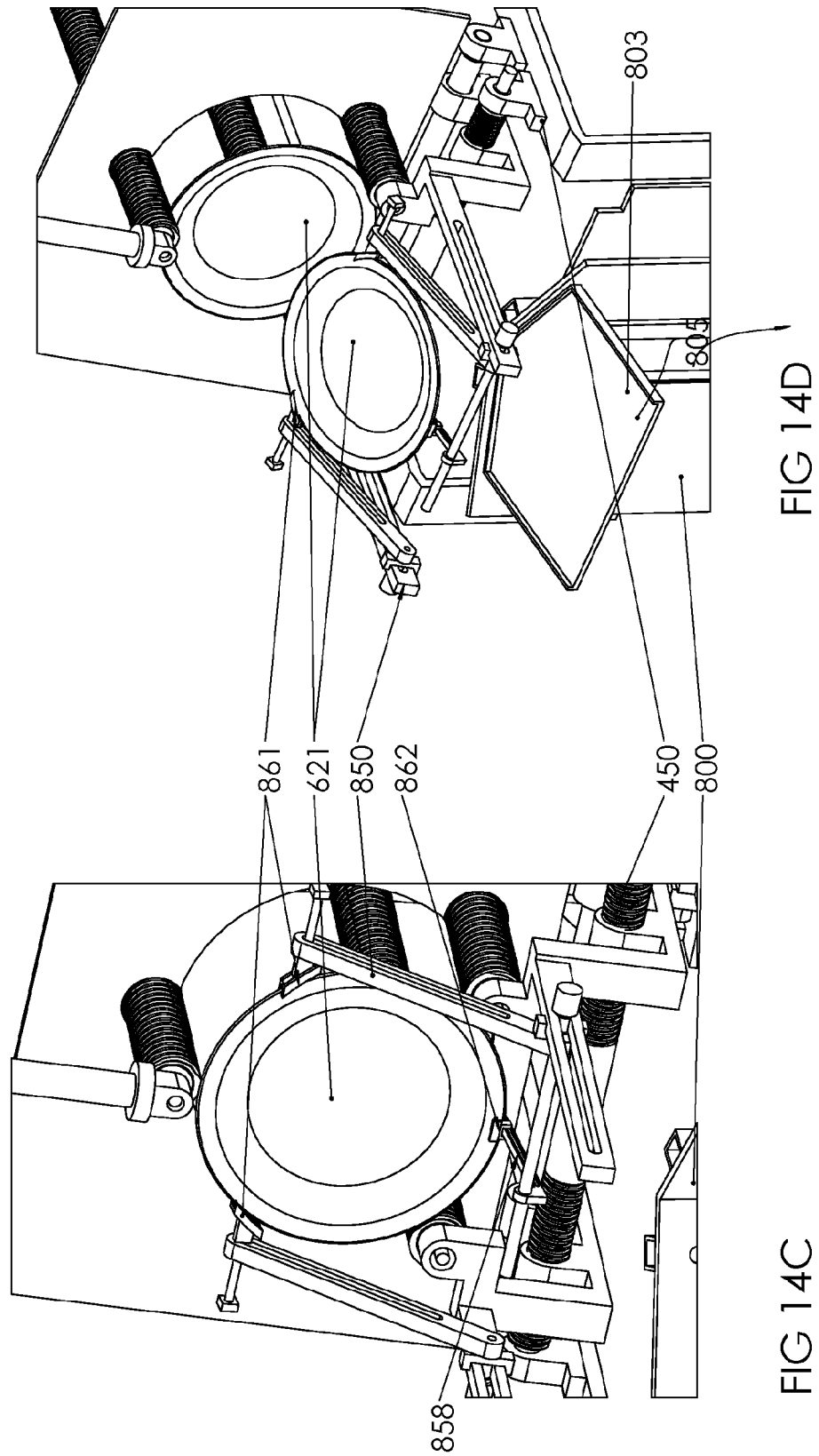

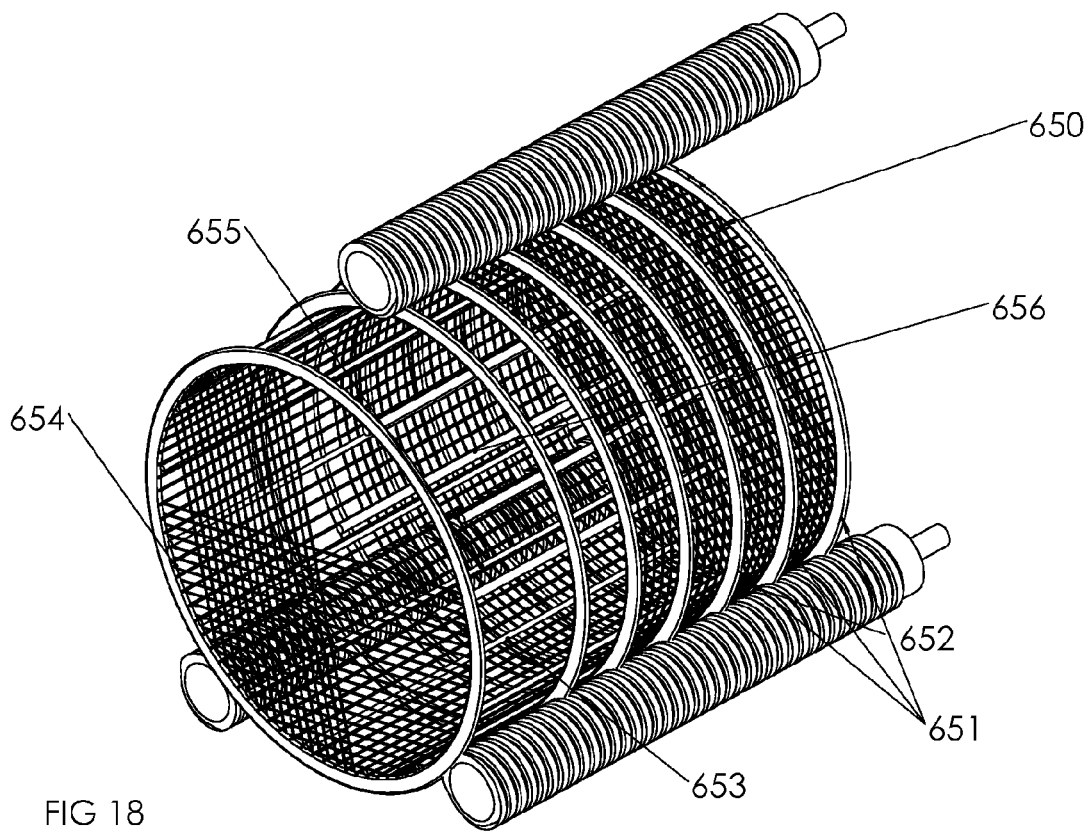
FIG 18
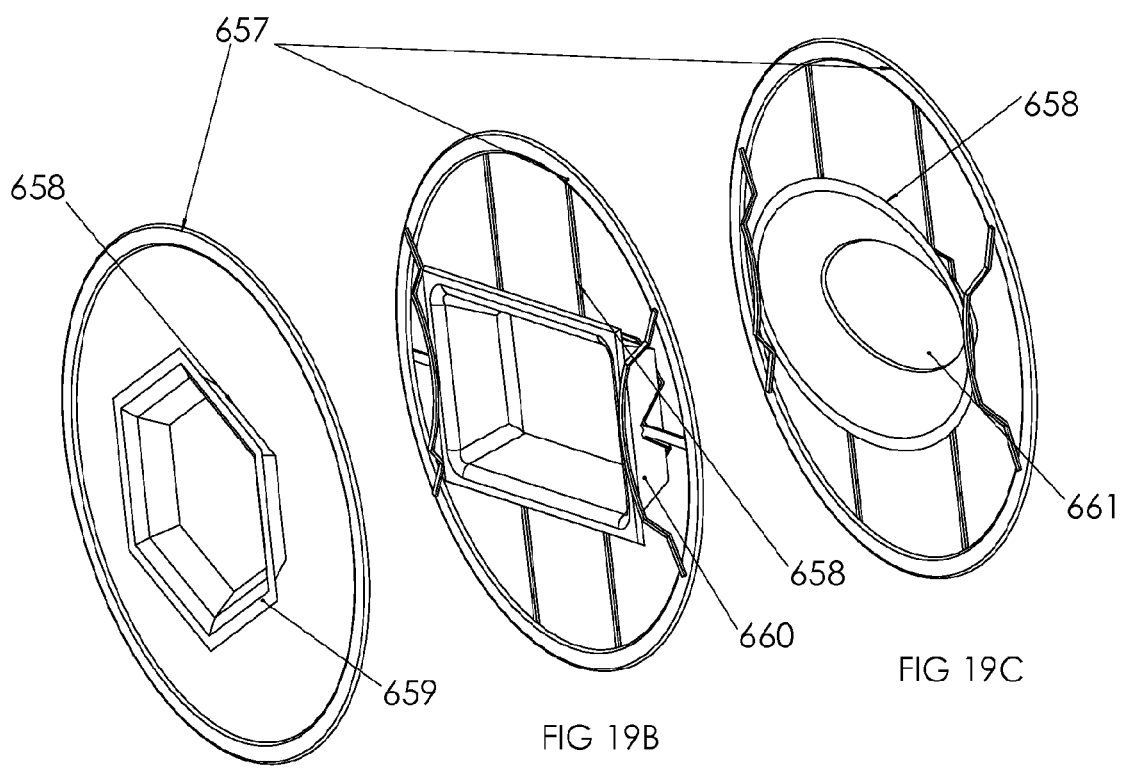
FIG 19A
FIG 19B
FIG 19C

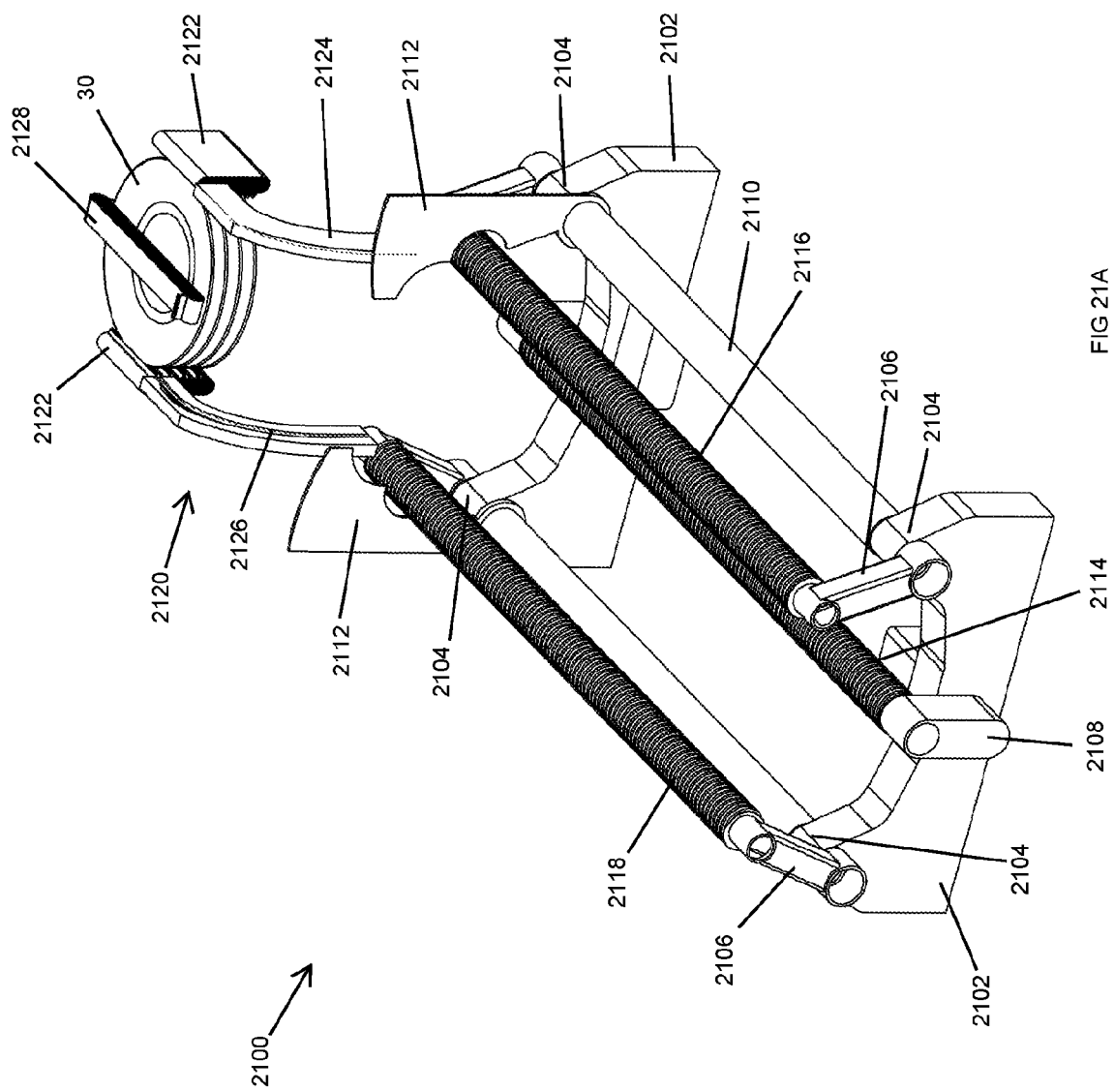

DISH WASHING APPARATUS AND DISH DRYING APPARATUS

This application is the U.S. national phase of International Application No. PCT/SG2018/050474 filed 18 Sep. 2018, which designated the U.S. and claims priority to SG 10201707766S filed 20 Sep. 2017, the entire contents of each of which are hereby incorporated by reference.

TECHNICAL FIELD

The present disclosure relates to dish washing and drying apparatus. More specifically it relates to conveyer type systems in which dishes are moved through a dishwashing system.

BACKGROUND

Commercial dishwashers are used in the food industry to clean a large volume of used dishes every day. They are typically installed in restaurants, canteens, and hotels.

There are several different categories of commercial dishwasher known today, and they are generally categorized by their washing capacity and/or other specifications. The capacities of commercial dishwashers can range from a few hundred dishes per hour to twenty thousand dishes or more per hour. It is common practice for the type of dishwashing apparatus to be selected according to the required washing rate. The other factors that may be considered before purchasing a commercial dishwasher include water and energy efficiency, as well as the operating cost and/or the use of green technologies. Recently, water scarcity and increasing operation costs have driven the commercial dishwasher industry to develop better performing dishwashing machines.

Besides washing capacities, commercial dishwashers can also be categorized into different types such as: conveyor type (e.g. freight-type) dishwashers for serving extremely high volume of dishes at an extremely high washing rate, rack-type dishwashers for serving a medium volume of dishes at a medium washing rate, and hood-type (over-the-counter) dishwashers for serving low volume of dishes at a low washing rate. There are also hybrid dishwasher types in between, the functions and working principles are generally the same.

A conveyor type dishwasher is usually installed for extreme high volume washing rate. This type of dishwasher has multiple chambers and treatment zones. The conveyor system with tooth-like structures for holding dishes moves at a constant speed, thereby moving the dishes in a forward direction passing through individual chambers and treatment zones. This type of dishwasher will wash and handle between ten to twenty thousand or more dishes per hour. The length of this type of dishwasher can vary from twenty to forty meters or more, and the width can vary from one to two or more meters. A small conveyor type dishwasher will wash and handle between three to ten thousand dishes. The length can vary from ten to twenty-five meters, and the width can vary from one to two or more meters. Due to the size of conveyor type dishwashers, they are usually deployed in large food catering businesses such as large hotels, and hospitals whereby there are centralized washing facility within the building.

Rack type dishwashers handle between two to five hundred racks per hour. Used dishes are loaded onto a rack and subsequently the rack is pushed into a machine feeder that drives the rack through the dishwasher and past multiple treatment zones. Each specially built rack holds between ten to twenty dishes. The length of this type of dishwasher varies between two to ten meters, and the width is about a meter wide. Rack type dishwashers are usually deployed in large restaurants, middle-sized hotels and school canteens.

Both conveyor and rack types of dishwashers can be custom-built to specific requirements. For example, extra chambers for additional rinsing, or an elongated conveyor belt to transport the racks and/or dishes away from the dishwasher to a clean collection zone may be added to the conventional dishwasher setup.

Hood-type dishwashers can handle between forty to one hundred racks per hour. The length of this type of dishwasher is usually less than a meter long. However, if desired, a single bowl stainless steel sink and/or a stainless steel table top may be installed for the pre and post washing process. This type of dishwasher is commonly deployed in small restaurants, or in places where space is at a premium within a kitchen setting.

Manual dishwashing requires a labourer to clean the dishes. The process is time-consuming, manually repetitive and monotonous. Although manual washing does not require electrical energy, water usage is usually high and dependent on the washing style that varies from person to person. The disadvantages of manual washing include the slow laborious process, high volume of man hours required, water wastage, and inconsistencies in quality and cleanliness of the cleaning, extensive manual washing also poses health risks to the labourer that washes the dishes as they may be come into contact with the detergent used. These disadvantages can be overcome by using automatic dishwashers.

Automatic dishwashers generally have multiple functions, as well as different zones and programs that are all integrated and work systemically within a standard dishwashing unit. If additional washing volume is needed, the units may have a function to alter the pre-set washing time such as by increasing or decreasing the washing speed. The program is designed to operate on a pre-set transportation routine to move the dishes through the different zones such as the prewash zone, main wash zone, post-wash zone, final-rinse zone, drying zone and collection zone. Each zone may have an associated tank in which sprayed liquid and an array of spray nozzles that are used to perform a pre-set function.

Another important factor when using commercial dishwashers is the operating cost. A newer model has cost effective operation system build into the features. Operating cost saving can be achieved by installing different type of sensor across the dishwasher. These sensors, ranged from temperature sensor, pressure and flow sensor or dish detecting sensor. These sensors provide inputs to a CPU unit to control, monitor and regulate the resources needed to run the dishwasher. Resources that can be optimized include water, electricity and detergent.

The conveyor and rack type dishwashers both require large installation and working space. The hood type dishwasher can achieve good economies of scale but it still requires a large workspace.

Within some types of dishwashing apparatus, a rubber material curtain may be installed as a water barrier between each treatment zones to contain the water used in each zone when a dish moves from a treatment zone to the next. These curtains are short, equally-spaced vertical cut slips that have insulation and a low friction coefficient to contain the heat within the designated space to reduce energy lost when the dish move to the next zone.

These zone transitions are difficult to optimize in terms of space usage. For example, as the dish progress from one heated water treatment zone to the next treatment zone, it faces three constraints. Firstly, the water outlet is positioned too near the entrance or extremely close to the next treatment zone, it may result in unwanted water spill over to the next zone. Usually, each treatment zone has its own collecting water tank. Therefore unwanted water spill in between the zone increases the workload of the water filtering system. Secondly, as the dish passes through, it has to touch the rubber material curtain, pushing it upward and along the distance travel. Once the rubber is pushed upward, there is an unwanted opening space, or gap. This opening space creates unwanted energy lose or allow the treatment water to pass through to the next zone. Most importantly, at the last treatment zone where heated air is blown downward to dry the wet dishes, the unwanted open space allows sudden hot air to escape the treatment zone. This is extremely dangerous for a labourer who collects the dish near the last treatment zone, which may result in burns from the hot air that escapes from the last treatment zone. Lastly, after the rubber material curtain touches the topside of the dish as it passes from one zone to the next, the rubber material curtain naturally drops down and touches the next dish. The residue on the rubber material curtain may be propelled from this action to various directions. Hence, the current dishwashing design requires a reasonable transition space in between the treatment zones.

A hood-type dishwasher machine has the advantage of containing the washing cycle within a prescribed space because the racks that hold the dishes do not move. Water is dispensed from a revolving mechanism, which is positioned at the top and at the bottom of the dishwasher machine. In this design, no transition space is needed as there is no spillage from one zone to the next. The machine just needs to run through the washing program cycle. However, this type of dishwasher usually does not include a high temperature drying cycle. This is not a cost effective solution to dry the dishes as the space within the dishwasher is always at a high humidity level. Hence, drying of the dishes is usually performed by manually wiping away of the remaining water residue.

Automatic dishwashers have improved the dish washing process, but the loading of used dishes and unloading of washed dishes still remains a manual labour intensive process. The washing capacity can only be as effective as the number dishes loaded and dispensed onto the conveyor or onto the rack-type dishwasher. Preparation and coordination are needed between the person who is loading the dish and the person stacking the dishes. It is common to see that there are at least two rows of personnel standing beside the entrance and exit of an automatic dishwasher to load and unload the dishes at a very fast pace. As the conveyor is moving at a constant speed, the handler has to decide the spacing between the dishes, and the orientation that the dishes are to face before and during the loading. This has to be performed in spilt second decision. Dishes loaded with wrong orientation may result in an unclean surface at the end of the washing process. In order to prevent this type of mistake, the loader has to be fully aware and concentrate on the task ahead. For the loader, if another cycle of the load is complete and if one of the dishes is loaded at the wrong orientation, the loader has to unload the dish and reload it to the desired orientation. By doing so, the loader may miss the next cycle of dish loading action.

If the dishes are made of a fragile material like porcelain or glass, the job of loading and unloading the dishes is more delicate as the dishes are more fragile. Any breakage of a dish will usually result in a shutdown of the dishwasher apparatus. Hence, the dishwashing capacity has a correlation with the workspace and manpower designated around the dishwasher.

Another less discussed issue for dishwashing apparatuses is the noise pollution caused during the loading and unloading of dishes. As the dishes collide against each other during loading and unloading, an unpleasant sound is generated. This could be one of the reasons that large volume dishwashers are not installed near or inside kitchens.

The hood-type dishwasher does not have the issues related to loading and unloading the dishes at a very fast pace. However, the pre- and post-preparation process is significantly slower. This type of dishwasher is relatively smaller than the other types of dishwashers discussed, but the space that is needed and used for the pre- and post-preparation processes is sometime more than the space required for the other types of dishwashers. Typically, the dishes have to be pre-rinsed before loading onto the rack. Then only when the rack is full then is it economical for the rack of dishes to be wash. Normally, there is at least sufficient space for three racks to be worked on prior to entering the dishwashing apparatus. After the washing cycle, a labourer has to dry and pack the dishes, and this requires at least another three to four racking spaces after the dishwashing apparatus. Hence, hood-type dishwashers may require a large working area that is equivalent to that of a mini size rack-type dishwasher.

SUMMARY OF THE INVENTION

According to a first aspect of the present disclosure, a dishwashing apparatus comprises: a spray nozzle configured to spray a liquid onto a target zone; a first rod; a second rod; and a third rod; the first rod, second rod and third rod each having a screw thread on an outer surface and each being rotatable about a respective longitudinal axis; the first rod, second rod and third rod being arranged in a parallel configuration, at equal distances from a central axis, wherein the separation of each of the first rod, second rod and third rod from the central axis is configured or configurable to receive a plurality of dishes such that the screw thread on each of the rods engages with the circular rim or lip of the dishes and when the rods are rotated about their respective axes, the dishes are caused to move relative to the spray nozzle in the direction of the central axis and rotate as they pass through the target zone.

According to a second aspect of the present disclosure, a dish drying apparatus for drying dishes having a circular rim or lip is disclosed. The apparatus comprises: an air outlet configured to direct air onto a target zone; a first rod; a second rod; and a third rod; the first rod, second rod and third rod each having a screw thread on an outer surface and each being rotatable about a respective longitudinal axis; the first rod, second rod and third rod being arranged in a parallel configuration, at equal distances from a central axis, wherein the separation of each of the first rod, second rod and third rod from the central axis is configured or configurable to receive a plurality of dishes such that the screw thread on each of the rods engages with the circular rim or lip of the dishes and when the rods are rotated about their respective axes, the dishes are caused to move relative to the air outlet in the direction of the central axis and rotate as they pass through the target zone.

An advantage of embodiments of the invention is that when dishes are engaged by the three rods, they are held in three points. This means they cannot be moved by the liquid from the spray nozzle or the airflow from air outlet. Thus embodiments of the present invention provide for dish drying apparatus in which high velocity airflows can be used for drying.

The positions of the rods may be adjustable to allow the apparatus to accommodate different sized dishes.

According to a third aspect of the present invention a dishwashing system is provided which is configured to subject dishes to a plurality of treatments, each of the treatments being applied in a respective treatment zone, the dishwashing system comprising a dishwashing and dish drying apparatus arranged to move dishes through each of the treatment zones. The central axis of the dishwashing apparatus may be arranged at an angle to the horizontal direction such that the dishes raise in vertical direction as the dishes progress along the screw thread in the direction of the central axis.

The system may comprise a baffle device arranged to reduce water flow between a respective pair of treatment zones. In an embodiment, one of the treatment zones comprises a drying zone having a drying apparatus the drying zone comprises a baffle device configured to direct airflow from the air outlet onto the target zone. The baffle device may comprise a plurality of plates arranged to slide relative each other the plurality of plates arranged to provide an aperture having a size which is adjustable depending on a relative positioning of first, second, and third.

The position adjustment system may be configured to control the relative positioning of the plurality of plates.

A dishwashing system may comprise a plurality of dishwashing apparatuses. These may be fixed or adjustable to accommodate different sizes of dish.

The dishwashing system may further comprise a loading system a loading system, for loading dishes onto the dishwasher apparatus. The loading may comprise a pivotally movable arm or a robotic arm or a pair of curved guides having grooves configured to receive the rim or lip of a dish and transfer the dish from a horizontal orientation to a position in which the dish is in contact with the first, second and third rods.

The dishwashing system may further comprise an unloading system, for unloading dishes from the dishwasher apparatus. The unloading system may comprise a knockdown device or a cooperative robotic arm.

The dishes may be stored on trolleys which store dishes sorted according to a lip or rim diameter.

In order to allow non-circular dishes to be washed in the system a holder configured to hold dishes may be provided which comprises a circular ring configured to engage with the screw thread.

In order to allow items such as cutlery and utensils to be washed, a cage assembly comprising a plurality of rings configured to engage with the screw thread. May be provided.

BRIEF DESCRIPTION OF THE DRAWINGS

In the following, embodiments of the present invention will be described as non-limiting examples with reference to the accompanying drawings in which:

FIG. 2C is a top down view of the dishwashing system shown in FIGS. 2A and 2B;

FIG. 4A shows a perspective view of the loading end of the dishwasher assembly according to an embodiment of the present invention;

FIG. 4B shows an expanded view of a rod engaging with the circular rim of lip of a dish;

FIG. 4C shows a perspective view of the leading end of a rod according to an embodiment of the present invention;

FIG. 4D shows an expanded view of a rod engaging with the circular rim of lip of a dish;

FIGS. 8A to 8D show a cross sectional views of drum motor assembly inserted within one of the three rods of the dishwasher apparatus according to an embodiment of the present invention;

FIGS. 9A and 9B show a perspective and a side view of the loading end of the dishwashing apparatus according to an embodiment of the present invention;

FIGS. 10A and 10B respectively show a perspective view and a side view of the unloading end of a dishwashing system according to an embodiment of the present invention;

FIGS. 10C and 10D show views of a collaborative unloading arm retrieving a dish from the unloading end of a dishwashing system according to an embodiment of the present invention;

FIGS. 12A to 12D show details of a dish lifting mechanism of a compact loading unit according to an embodiment of the present invention;

FIGS. 13A to 13E show views of a dish loading arm system according to an embodiment of the present invention;

FIGS. 14A to 14D show views of a dish unloading system according to an embodiment of the present invention;

FIG. 18 shows a cage assembly for use in a dishwashing system according to an embodiment of the present invention;

FIGS. 19A to 19C show dish holder devices for use in a dishwashing system according to an embodiment of the present invention;

FIGS. 21A to 21C show dishwashing apparatus according to an embodiment of the present invention.

DETAILED DESCRIPTION

Figure 1:
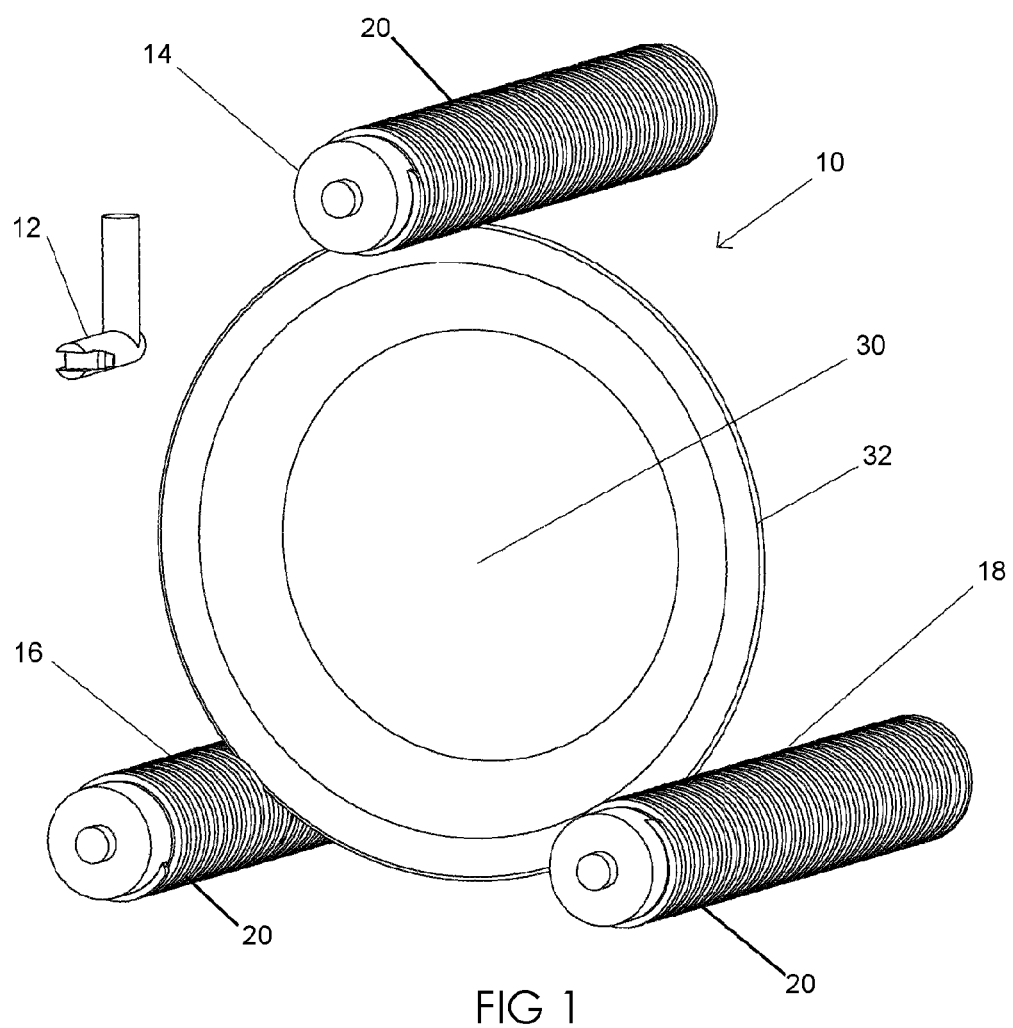
FIG. 1 shows a dishwashing apparatus according to an embodiment of the present invention.

FIG. 1 shows a dishwashing apparatus according to an embodiment of the present invention. The dishwashing apparatus 10 is configured for washing dishes 30 having a circular rim or lip 32. The dishwashing apparatus 10 comprises a spray nozzle 12 arranged to spray a liquid such as water or a water detergent mix onto a target zone. The dishwashing apparatus 10 further comprises a first rod 14, a second rod 16, and a third rod 18. The first rod 14, second rod 16, and the third rod 18 are each provided with a screw thread 20 on an outer surface. Each rod is rotatable about a respective longitudinal axis. The first rod 14, second rod 16, and the third rod 18 are arranged in a parallel configuration, at equal distances from a central axis. The first rod 14, second rod 16, and the third rod 18 are arranged relative to the central to receive the dishes 30 such that the screw thread 20 on each of the rods 14, 16, and 18 engages with the circular rim or lip 32. When the first rod 14, second rod 16, and the third rod 18 are rotated about their respective axes, the dishes are caused to move relative to the spray nozzle in the direction of the central axis and rotate as they pass through the target zone. In some embodiments, the positions of the three rods are adjustable to accommodate different sizes of dishes.

The dishwashing apparatus 10 is designed to provide efficient cleaning of dishes with a circular rim and lip. In use, each dish with its circular rim and lip engages with the screw thread on the three rods and when the rods rotate, the dish is conveyed in the direction of the central axis. Additionally, the dishes also rotate around the central axis. Thus, as the dishes pass the spray nozzle, the rotation of the dishes results in the target zone of the spray nozzle moving around the dishes. Thus, a large area of the dish is spray cleaned as it passes through the target zone. Multiple spray nozzles may be used with the dishwashing apparatus to spray liquid onto multiple zones through which the dishes are conveyed resulting in highly targeted and high precision cleaning of the dishes.

Figure 2A:
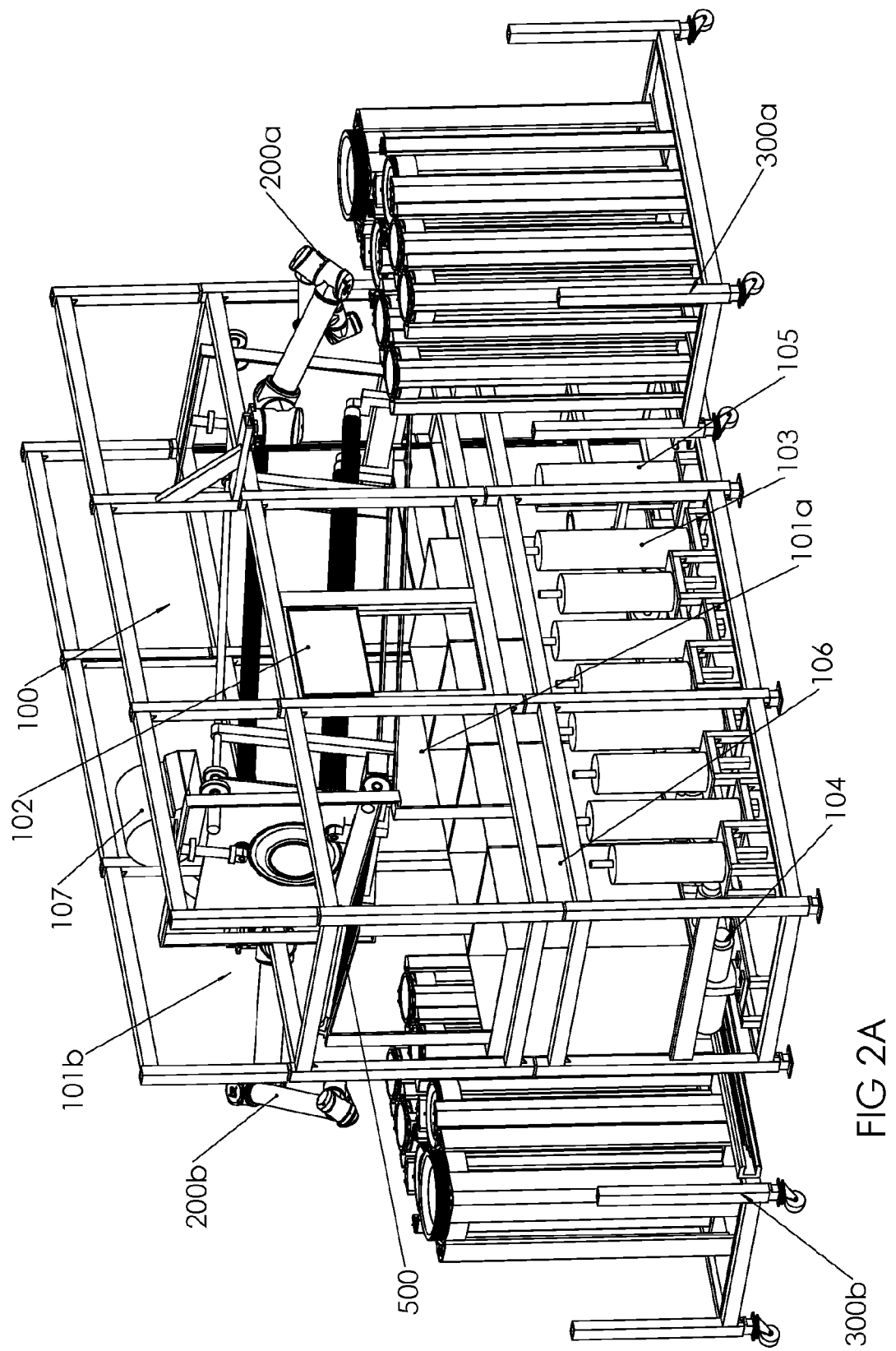
FIGS. 2A and 2B show perspective views of a dishwashing system according to an embodiment of the present invention.
Figure 2B:
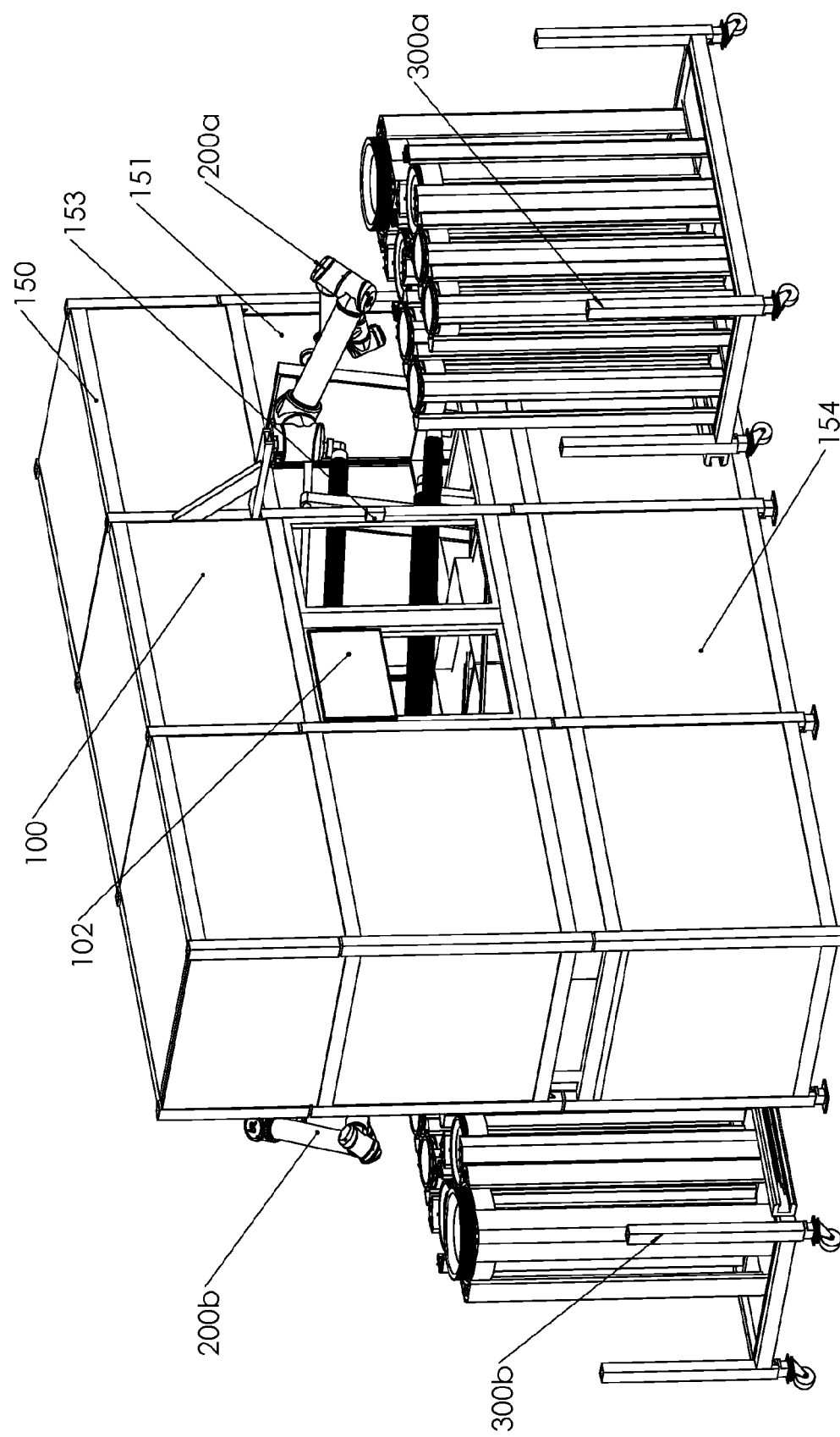

FIGS. 2A and 2B show a perspective views of a dishwashing system according to an embodiment of the present invention which comprises a dishwashing apparatus as described above with reference to FIG. 1. FIG. 2A shows the internal components of the dishwashing system and FIG. 2B shows an exterior view. The dishwasher system 100 comprises a support frame that may be divided into a lower portion 101a and an upper portion 101b. The lower portion 101a supports the operational components of the dishwashing system such as a water holding tank 106, a water pump 104, a filtration system 103, as well as a filter control unit 105 and a water heater. The upper portion 101b supports the dishwashing apparatus 10 as described above in relation to FIG. 1. Additionally, the upper portion 109 may also support a drying unit 107, a pickup conveyor system 500, and a control interface 102. Affixed to the support frame of the dishwashing system are two collaborative robotic arms 200a and 200b respectively for loading and unloading dishes into and out of the dishwashing system 100. The dishwashing system 100 may also include a trolley 300a for storing and organizing dishes to be loaded onto the apparatus and a trolley 300b for storing and organizing dishes which are unloaded from the dishwashing system.

The dishwashing system 100 may include a plurality of treatment zones, such as, a loading zone, a prewash zone, a main wash zone, a post wash zone, a pre-rinse zone, a rinse zone, a drying zone, and an unloading zone. The prewash zone, main wash zone, and rinse zone may have their own water tank and pump for recirculating water to a specific filter and spray nozzle configured to spray a liquid onto a targeted zone in each treatment zone.

In the drying zone, the spray nozzle may be configured to spray air into a targeted zone. The air may be heated. As the dishes pass the spray nozzle the rotation of the dishes results in the target zone of the spray nozzle moving around the dishes. Thus, a large area of the dish is dried by the air spray as it passes through the target zone. Multiple spray nozzles may be used in the drying zone within the dishwashing apparatus to spray air onto multiple zones through which the dishes are conveyed resulting in highly targeted and high precision drying of the dishes.

Dishes to be loaded into the dishwashing system 100 are stored in the trolley 300a and organized according to their size (i.e. the diameter of the rim/lip of the dish). The collaborative loading arm 200a picks up a specifically sized dish and loads the dish onto the dishwashing apparatus such that the screw threads on the three rods 14, 16, and 18 engage with the rim or the lip of the dish being loaded at approximately the same time. Once the dish is engaged with the screw thread on the rods the dish is conveyed through the dishwashing apparatus in the direction of the central axis of the dishwashing apparatus through the dishwashing system 100. Thus the dishes pass through the target area that is sprayed by the liquid from the spray nozzle 12. The water pump 104 supplies water to a water spray device and water spray nozzle 12 for spraying a liquid onto a target zone. A drying unit 107 such as an air dryer dries the dishes after passing through the targeted zone. The dishes exit the dishwashing apparatus and fall onto a soft conveyor belt system 500 from where the collaborative robotic arm 200b picks up the dishes and transfers them to a trolley 300b for storage. A control interface 102 allows user input of controls to the functions of the dishwashing apparatus 10 and dishwashing system 100 such as controlling the collaborative robotic arms, the rotation of the rods and the activation of the support systems.

As shown in FIG. 2B the dishwasher system 100 comprises a plurality of panels 154 fixed onto the upper and lower portions of the frame structure 150. The plurality of panels 154 may act as a sound barrier, a liquid barrier, and/or a heat barrier. The panels 154 may be removable to allow access for maintenance. The dishwashing system 100 may include a window panel 153 to allow visual inspection. A dish loading point (e.g. absent panel 151) is provided to allow dishes to be placed onto the dishwashing apparatus. The collaborative robotic arms 200a and 200b may be mounted on the frame structure 150 by a support bracket 155.

FIG. 2C is a top down view of the dishwashing system shown in FIGS. 2A and 2B. As shown in FIG. 2C the dishwashing apparatus 10 is installed in the dishwashing system 100. The dishwashing system 100 includes the collaborative robotic arms 200a and 200b for loading and unloading dishes into and from the dishwasher apparatus. The collaborative robotic arms are attached to the system via the support bracket 155. The dishwashing system 100 also includes a soft conveyor belt system 500. Aligned with the dishwashing system 100 are two trolleys 300a for storing dishes to be loaded and 300b for storing dishes that are unloaded.

In use, the trolley 300a presents a dish to be loaded at the upper most surface of the trolley and at a protruding position such that the collaborative robotic arm 200a may easily engage with the plate and transfer it to the dishwashing apparatus 10. Once a dish is transferred to the dishwashing apparatus 10, the rods of the dishwashing apparatus engage with the dish as described above and convey it through the dishwashing system until it exits the dishwashing apparatus 10 and lands on the soft convey system 500. The collaborative robotic arm 200b then engages with the dish picks it up and transfers it to the trolley 300b for storage.

Figure 3A:
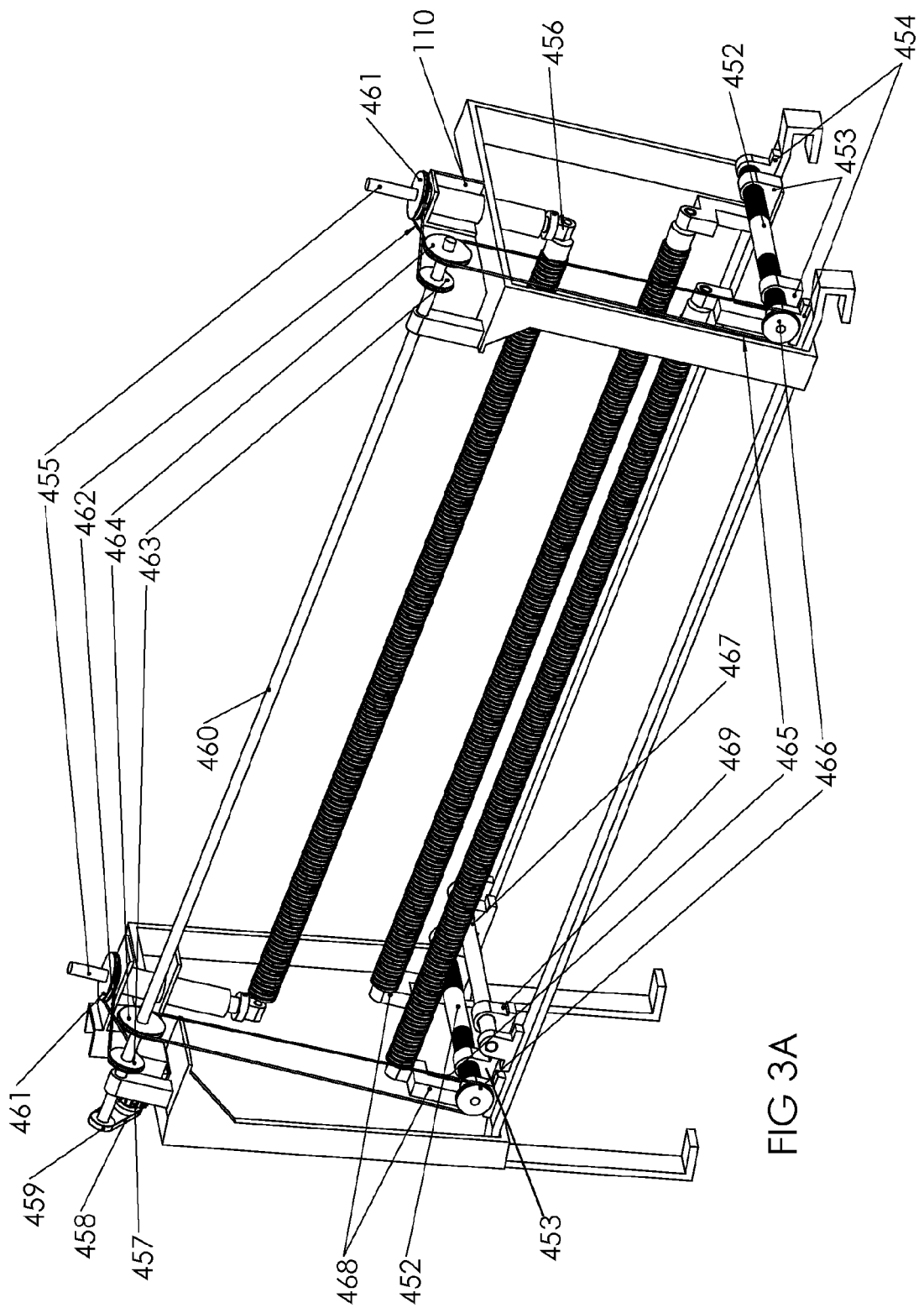
FIG. 3A is a perspective view of a position adjustment system of the dishwashing apparatus according to an embodiment of the present invention.

FIG. 3A is a perspective view of a position adjustment system of the dishwashing apparatus according to an embodiment of the present invention. As shown in FIG. 3A the dishwasher apparatus 10 is installed in a frame 110. The dishwashing apparatus 10 is supported by the frame 110, which may be positioned in the uppermost portion 101b of a dishwashing system. The dishwashing apparatus 10 may be placed in the system in a substantially horizontal arrangement or more preferably at an angle such that the loading end is lower than the unloading end, this generally reduces the volume of water from a first zone entering a second zone but allows for water from a second zone to flow backwards into a first zone therefore keeping the liquid in the more forward zone cleaner. As mentioned previously, the first rods 14, second rod 16, and the third rod 18 are arranged in a parallel configuration, at equal distances from a central axis. The separation of each of the first rod 14, second rod 16, and the third rod 18 from the central axis is configured or configurable to receive a plurality of dishes such that the screw thread 20 on each of the rods 14, 16, and 18 engages with the circular rim or lip of the dishes. That is, the positioning of the first rod 14, second rod 16, and third rod 18 are adjustable by a position adjustment system coupled to the rods 14, 16, and 18. The position adjustment system allows the separation of each of the first rod 14, second rod 16, and the third rod 18 from the central axis to be adjusted to the size of a specific dish type. This allows the dishwashing apparatus and system to accommodate varying sized dishes.

The position adjustment system controls the positioning/distance of the first rod 14, second rod 16, and third rod 18 from the central axis. In particular the position adjustment system includes a gear 459 and belt 458 that control the positioning of the three rods 14, 16, and 18. The gear 459 and belt 458 is driven by a motor 457. The position adjustment system is coupled to both ends of the rods.

The gear 459 and belt 458 are connected to a drive shaft 460 that is rotatably mounted to the frame 110. The drive shaft 460 extends the substantial length of the frame 110, and includes two pairs of gears: a pair of upper gears 463, and a pair of bottom gears 464 that control the positioning of the three rods 14, 16, and 18. The upper gear 463 engages with a vertical positioning gear 461 via a chain 462 that drives a telescopic linear screw assembly 455 mounted on the frame 110. The telescopic linear screw 455 is rotatable either clockwise or counter clockwise to adjust the vertical position of the first rod 14. The telescopic linear screw 455 rotatably connects to the first rod 14 by a shaft mounting 456.

The bottom gear 464 engages with a horizontal positioning gear 466 via a chain 465 and controls the horizontal position of the second and third rods 16 and 18. The horizontal positioning gear 466 drives a symmetrically ended screw 452, the symmetrically ended screw 452 has an external helical thread at its first and second end which is compatible with the external thread on a shaft support 453 which couples to one of the rods 16 and 18. The shaft support 453 may further engage with a support rod 467 via a secondary support member 469. As the horizontal positioning gear 466 rotates it causes the symmetrically ended screw 452 to rotate and therefore the shaft support 453 which engages with the threaded portion of the symmetrically ended screw 452 is caused to moves linearly along symmetrically ended screw therefore changing the horizontal positioning of the first and second rods 16 and 18. Therefore the position adjustment system causes the positioning/distance of the first rod 14, second rod 16, and third rod 18 from the central axis to change thereby allowing the dishwasher assembly to be able to engage the circular rim or lip of the dishes of different sizes. The secondary support member 469 engages with the support rod 467 to prevent the twisting of the shaft supports 453 when being driven by the symmetrically ended screw 452 preventing jamming of the horizontal movement of the rods 16 and 18. Location sensors 468 may be mounted onto shaft supports 453 to allow for monitoring and/or control of the positioning of the rods.

The belt 462 and the chain 465 may be provided as bead chains. The use of a bead chain system provides a flexible, positive drive mechanism to move the three rods 14, 16, and 18. The bead chain takes advantage of the spherical shape of the beads in the chain that allow it to swivel thereby providing an omni-directional positive drive that allows great freedom in the positioning and orientation of the gear belt/chain systems within the dishwashing apparatus 10 and system 100.

Figure 3B:
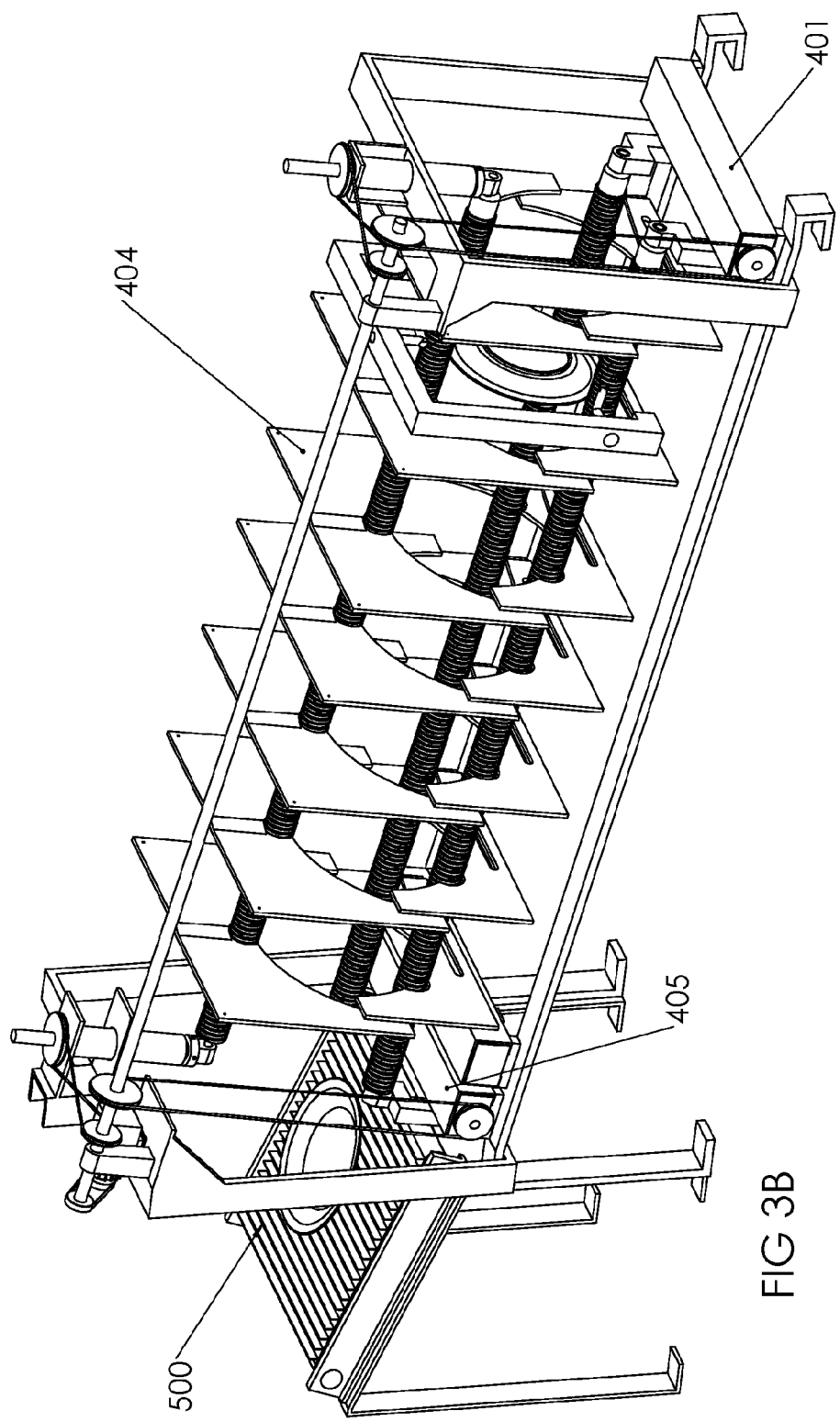
FIG. 3B is a perspective view of the dishwashing apparatus and position adjustment system separated into different zones by baffles according to an embodiment of the present invention.

FIG. 3B is a perspective view of the dishwashing apparatus and position adjustment system separated into different zones by baffles according to an embodiment of the present invention.

FIG. 3B shows a dishwashing apparatus and position adjustment system according to the embodiment shown in FIG. 3A including baffles 404 installed to segment/compartmentalize the dishwashing system. A pickup conveyer 500 may also be attached to the dishwashing system 100 at the unloading end. The pickup conveyer 500 provides a surface for the dishes to be conveniently picked up from and then stored away. A dirt cover 401 and a dry cover 405 may be placed over the symmetrically ended screws 452 at the loading and unloading ends of the dishwasher to prevent water and dirt from collecting on the screw thread of the symmetrically ended screw 452.

FIG. 4A shows a perspective view of the loading end of the dishwasher assembly according to an embodiment of the present invention. FIG. 4A shows the first rod 14, second rod 16, and third rod 18 movably attached to the frame of a dishwasher system 100. A collaborative robotic arm 200a with a dish gripper assembly 202 is capable of loading a dish onto the dishwasher apparatus.

FIG. 4B shows an expanded view of the second rod 16 engaging with the circular rim of lip of a dish while FIG. 4D shows an expanded view of the third rod 18 engaging with the circular rim of lip of a dish. As shown in FIGS. 4B and 4D the second and third rods 16, and 18 may each include a non-threaded lead area 470 before the screw threaded portion of the respective rod. The non-threaded lead area 470 allows the collaborative loading arms 200a to correctly align the dishes with the dishwasher apparatus such that each rod can engage with circular rim or lip of a dish at the same time. A similar non-threaded portion can be found on the first rod 14 as shown in FIG. 4A.

FIG. 4C shows a perspective view of the leading end of a typical rod according to an embodiment of the present invention. The screw treaded 473 on the rod (any of rods 14, 16, and 18) includes an engagement portion 471 with a offset portion 472 with a cut away segment 474 that allows for easy loading of the dishes into the dishwasher apparatus 10.

In use, the dishwashing apparatus 10 is controlled by a controller using signals from encoders which monitor the rotational positions of the rods such that when the collaborative robotic arm 200b loads a dish into the apparatus the dish may slide along the non-threaded portion 470 of the rods until the dish reaches the engagement lead thread portion 471. The controller uses the signals from the encoders to ensure that the engagement thread portion 471 is aligned and engages with the rim or lip of the circular dish at substantially the same time. The controller also ensures that all the rods 14, 16, and 18 start and rotate at the same time and speed thereby ensuring the dishes gripped by the thread move through the dishwasher system 100 and follows the thread on all the three rod 14, 16, and 18 at a fixed rate. The screw threaded has a predetermined pitch and by skipping pitches in the screw thread the spacing between the dishes loaded into the system 100 may be varied.

Figure 5:
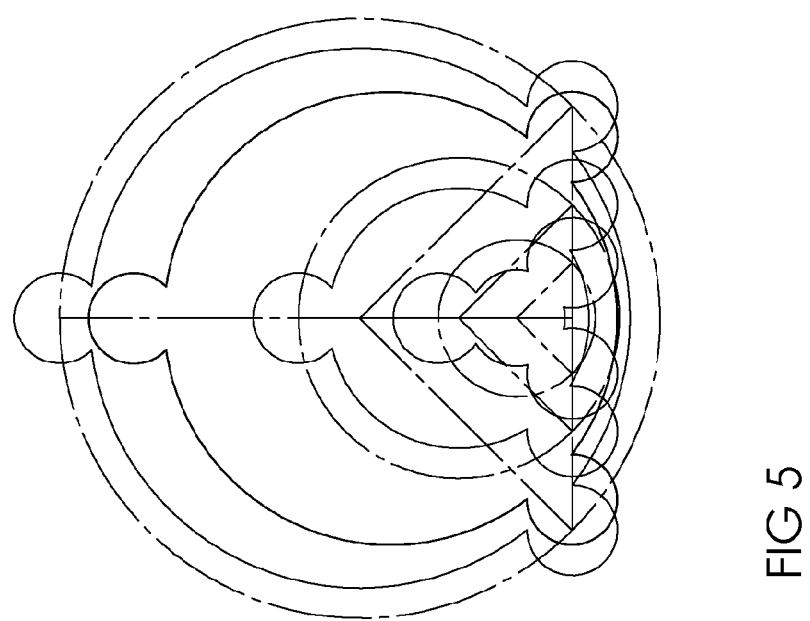
FIG. 5 shows a cross sectional view of the varying gape of the dishwashing apparatus according to an embodiment of the present invention.

FIG. 5 shows a cross sectional view of the varying gape of the dishwashing apparatus according to an embodiment of the present invention. The differing size (gape) of the cross sectional area defined by the three rods 14, 16, and 18 is shown in FIG. 5. By being able to select the appropriate gape size the dishwasher apparatus 10 may accommodate small, medium, and large sized dishes.

Figure 6:
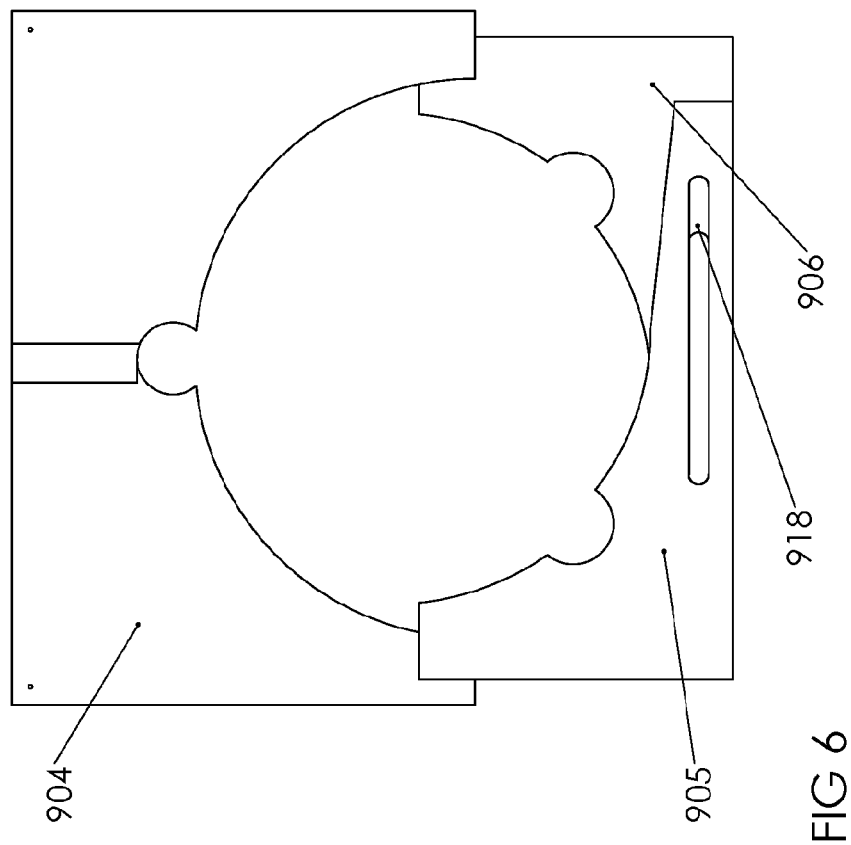
FIG. 6 shows a cross sectional view of the baffles in dishwashing system according to an embodiment of the present invention.

FIG. 6 shows a cross sectional view of the baffles. The baffles comprise a top plate 904 and two bottom plates 905, 906. The three plates 904, 905, and 906 provide a variable aperture around the dishwasher apparatus 10 and co-operate with it to define a central orifice through which the dishwasher apparatus 10 passes and in turn conveys the dishes. The two bottom plates 905 and 906 include a sliding mechanism 918 that controls the orientation of the two plates 905 and 906 as they slide against each other.

The co-operative movement of the plates 904, 905, and 906 may be in response to the movement of the three rods 14, 16, and 18. Accordingly, the orifice may be sized appropriately to allow differently sized dishes to pass through this ensures that the baffle functions optimally irrespective of the size of the dishes, for example when small bowls are used the orifice size is small optimally preventing overspray from the bowls leaving the specific zone and when large plates are in use the orifice size is large optimally preventing overspray from the large plates leaving the zone.

In some embodiments, a drying zone is formed by a plurality of baffles spaced relatively close together, for example between 5 cm and 50 cm apart. Extended nozzles are arranged at the top of the apparatus and are configured to blow air downward though the space between the baffles. The air may be heated. It is noted that in such an arrangement, the air flow is incident on the whole of each dish or substantially the whole of each dish from above. The effect of such an air flow is to is to drive any moisture downwards and thus to dry the dishes in an efficient manner.

Figure 7A:
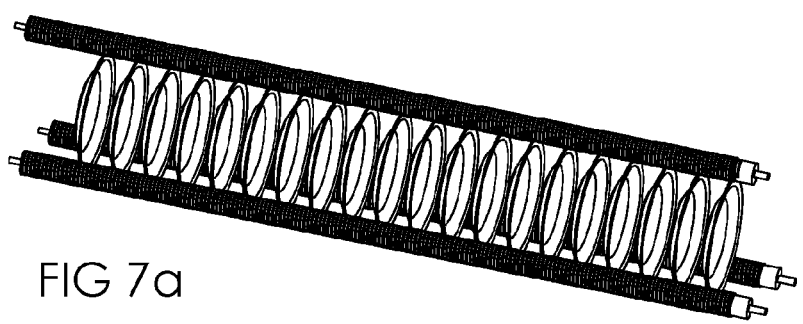
FIGS. 7A, 7B, and 7C show loading of dishes of different respective sizes onto a dishwashing apparatus according to an embodiment of the present invention.
Figure 7B:
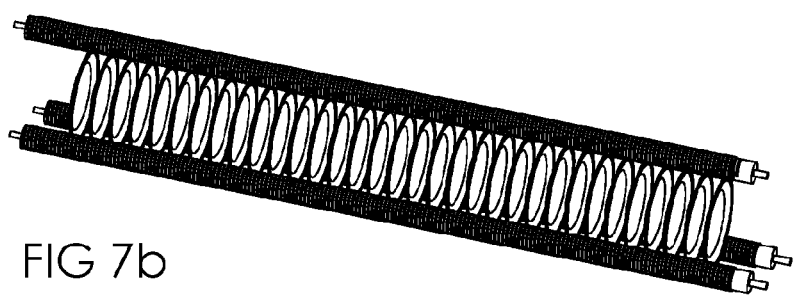
Figure 7C:
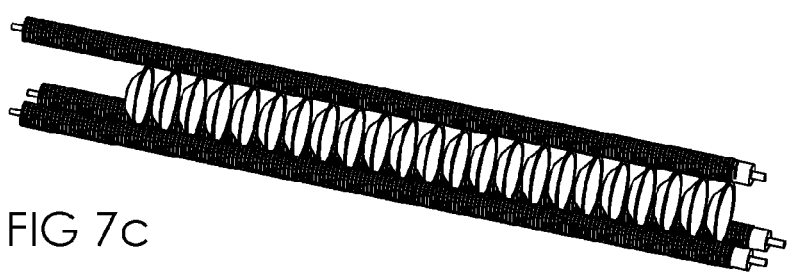

FIG. 7A shows the dishwashing apparatus engaging with large sized dishes according to an embodiment of the present invention. FIG. 7B shows the dishwashing apparatus engaging medium sized dishes according to an embodiment of the present invention. FIG. 7C shows the dishwashing apparatus engaging bowls according to an embodiment of the present invention.

As shown in FIGS. 7A, 7B, and 7C, the loading of dishes onto the dishwashing apparatus can be varied to control the separation of dishes. The space in between the dishes is configurable according to the shape and/or need of the dish by varying the number of screw threads in between the dishes. For deep dishes such as the bowls shown in FIG. 7C, the separation may be increased to allow the interior of the bowl to be cleaned.

In an embodiment, each of the three rods 14, 16, and 18 are driven by an individual drum motor assembly 451 contained within the respective rod.

FIGS. 8A to 8D show a cross sectional views of a drum motor assembly inserted within one of the three rods of the dishwasher apparatus according to an embodiment of the present invention.

As shown in FIG. 8A one of the rods 14, 16, 18 houses a drum motor assembly 476. As shown in FIG. 8B the rod may comprise a metal shaft 475 (e.g. a steel shaft) and a hollow core 451 in which the drum motor assembly 476 is inserted. The screw thread is on the external facing of the metal shaft 475. The screw thread 473 may be formed from plastic or rubber material. As shown in FIG. 8C the drum motor 476 includes an engagement end 484 that engages with the metal shaft 475 via a locking mechanism at 485 such as a pin lock 486 that firmly engages with the shaft at the locking position 485. The drum motor assembly 476 also includes a first connecting shaft 477 for connecting the rod via the drum motor to the frame. Thus the drum motor can cause the rod to rotate around its central axis. At a second end 479 of the rod there is hole which receives a shaft 480 which couples the second end 479 of the rod to the frame and allows the rod to rotate. The shaft has a hollow body 481 to allow wiring to be connected an encoder. The drum motor system 451 also includes an encoder 483 and a plate 482 for determining the rotational position of the rod. Bearings 478 allow the rod to rotate against the shaft 480.

Powering of the drum motor assembly causes the rod and external screw thread to rotate about the connection points to the dishwasher assembly and this rotation causes the dishes to move along the helical screw thread when engaged.

FIGS. 9A and 9B show a perspective and a side view of the loading end of the dishwashing apparatus according to an embodiment of the present invention.

The dishwashing system as described above in FIG. 3B may further comprise at least one spray device 900 for spraying liquid onto dishes. The spray device 900 has an inlet, into which liquid can be pumped to flow to a plurality of spray nozzles 903. The direction of the nozzles outlets may be varied from spray nozzle to spray nozzle such that different areas can be targeted. The spray nozzles are coupled to the spray device via T-junctions 902. The each of the spray nozzles may be a hollow cone nozzle, a full cone spray nozzle, and/or a flat fan pray nozzle, optionally the water spray device 900 may utilize a variety of spray nozzle types to optimize the spraying of the target area.

As shown in FIGS. 9A and 9B, the water spray device 900 has a circular/semi-circular/ring shape and the T-junction elements 902 with nozzles are spaced around the circumference of the water spray device 900 allowing water to be sprayed from multiple directions (upwardly, downwardly and from the left and right sides relative to the direction of movement of the dishes) towards the dishes. A plurality of spray devices 900 may be arranged one behind each other along the length of the dishwasher and/or in different treatment zones.

As shown in FIGS. 9A and 9B, the baffle plates 904, 905, and 906 are held in place by support wires 910 that couple to the dishwashing system. As described above in relation to FIG. 6, the baffle plates 904, 905 and 906 may include a sliding mechanism that controls the orientation of the two plates 905 and 906 as they slide against each other.

FIGS. 10A and 10B respectively show a perspective view and a side view of the unloading end of a dishwashing system according to an embodiment of the present invention.

As shown in FIGS. 10A and 10B, the dishwashing system 100 includes a knock down system for unloading the dishes from the dishwasher apparatus 10. This knock down system comprises a pair of rotating rods 511, each with a rotator 512 that includes a plurality of soft fins 513. The rotating rods are each driven by a motor 510. The plurality of soft fins 513 engage with the dishes as they leaves the screw threaded portion of the rods 14, 16, and 18 and knocks it down from the dishwasher apparatus 10. As shown in FIGS. 10A and 10B, the dishes land on a pickup conveyor system 500 comprising a belt 502 with soft fins 503 to cushion the landing of the dish after it is knocked down. The pickup conveyor 500 may include a movable stopper 507 that correctly guides the dishes to a center point position from where it can be easily stored away either by hand or by the collaborative robotic arm 200. It is noted that this configuration allows the dishes to exit the dishwashing system in an upward facing orientation which provides for easy later processing. As shown in FIGS. 10A and 10B, the top surface 517 of the dishes 621 is facing upwards when the dishes 621 land on the conveyer 500.

FIGS. 10C and 10D show views of a collaborative unloading arm retrieving a dish from the unloading end of a dishwashing system according to an embodiment of the present invention. As shown in FIGS. 10C and 10D, the movable stopper 507 controls the position of a dish 621 on the pickup conveyer 500. The dish 621 can thus be lifted by a gripping mechanism 255 attached to the collaborative unloading arm 200b. The stopper 507 also prevents this dishes from running off the pickup conveyor 500. As illustrated in FIG. 10D, the bottom surface 516 is facing downwards when the dishes are lifted. It is noted that the since the lip/rim of the dishes is located around the top surface of the dishes, the gripping mechanism 255 can move under the lip/rim of the dishes when they are in the upward facing position.

Figures 11A, 11B:
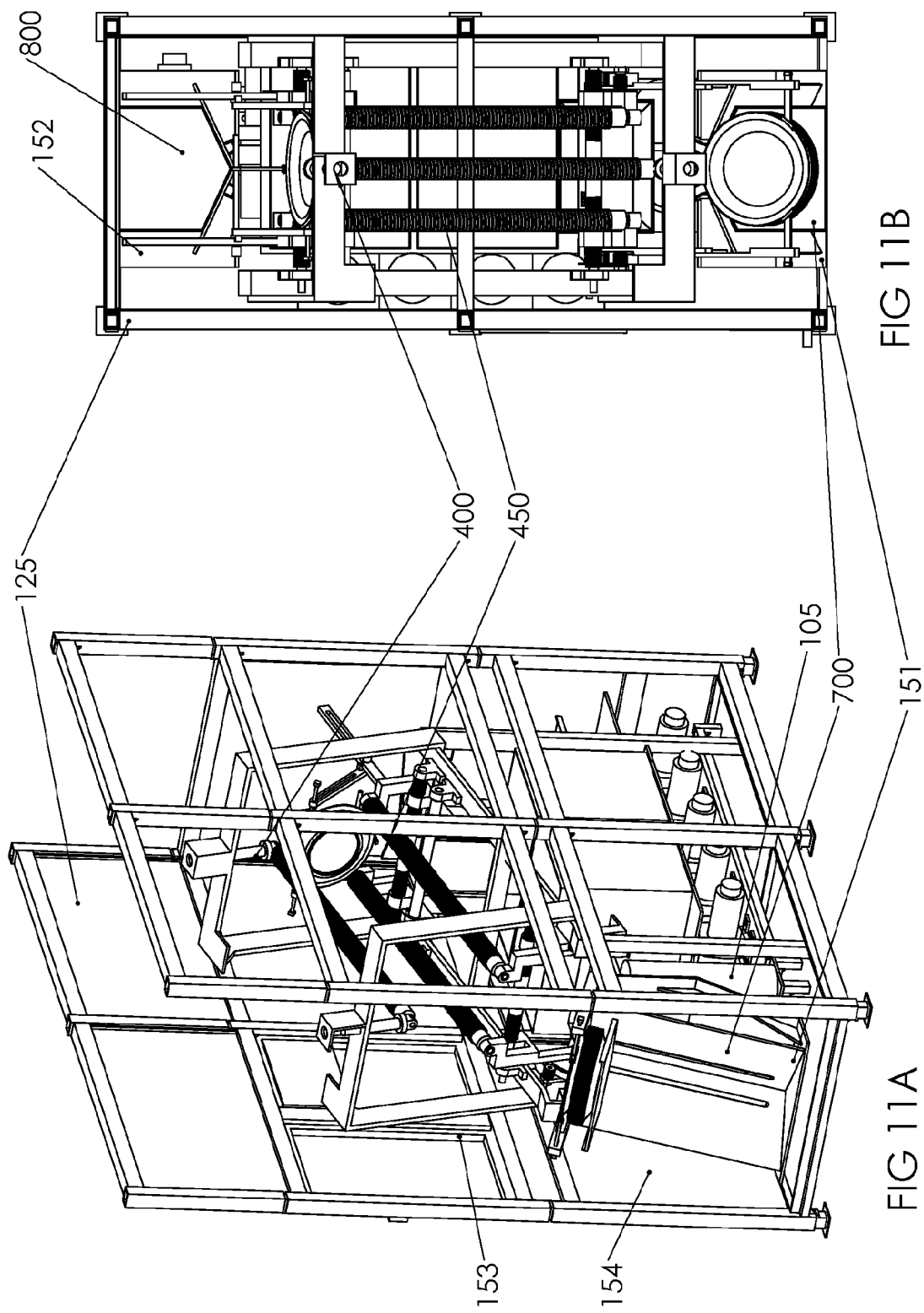
FIGS. 11A and 11B show a perspective view and a top view of a compact dishwashing system according to an embodiment of the present invention.

FIGS. 11A and 11B show a perspective view and a top view of a compact dishwashing system according to an embodiment of the present invention. The compact dishwashing system comprises a compact loading unit 700 and a compact unloading unit 800. The compact loading unit 700 is arranged at a loading point 151 and the compact unloading unit 800 is arranged at an unloading point 152. The compact dishwashing system 125 has a lower portion 101 which houses a filtration system 103, a water pump 104, a filter control unit 105 and a water holding tank 106. A control interface 102 is arranged at the side of the compact dishwashing system 125. As shown in FIGS. 11A and 11B, the compact dishwashing system 125 is housed within a housing comprising a plurality of panels 154, in some places windows 153 are provided in the housing. The compact dishwashing system comprises a compact frame 400 which supports a compact dishwashing apparatus 450.

FIGS. 12A to 12D show details of a dish lifting mechanism of a compact loading unit according to an embodiment of the present invention. The compact loading unit 700 comprises a base portion 701 with two guide plates 702 which support a platform 703. The vertical position of the platform can be changed by an elevator mechanism 704. A pair of feeder housings 705 are provided at the top of the dish lifting mechanism. Grippers 706 are located in the feeder housings 705. The grippers 706 are configured to grip the lips of dishes.

As shown in FIG. 12A, the elevator mechanisms 704 can adjust the elevation height 712 of the platform 703 according to the stack height 713 of dishes loaded on the platform 703 at the loading point 151. Thus, the top of the stack of dishes is adjacent to the grippers 706 within the feeder housings 705 as shown in FIG. 12B.

As shown in FIGS. 12C and 12D, the grippers move to an engaged position 707 and engage with the lip/rim 708 of a dish. A sensor 709 located on a guide plate 710 may sense the dish position and size. The grippers in the engaged position 707 then move to a lifted position 714 as shown in FIG. 12C this provides a gap 711 between the top dish and the lower dishes to allow the top dish to be loaded on to the dishwashing apparatus.

FIGS. 13A to 13E show views of a dish loading arm system according to an embodiment of the present invention. The system may form a compact dish loading unit 700 for loading dishes onto a compact dishwashing apparatus 450 supported by a compact frame 400. An arm 758 is mounted on an arm assembly 750. The arm assembly 750 comprises a support bar 751 and a base extension 752. The arm 758 is attached to the arm assembly 750 at a pivot point 753. A curved rib 754 extends from the arm 758. The rib curved rib 754 provides an arc platform 756. A motor 757 located on the support bar 751 is used to cause the arm 758 to rotate around the pivot point 753. The arm is provided with a telescopic arm 759 which allows the length of the arm to be adjusted to accommodate different dish sizes.

As shown in FIG. 13B, the arm 758 can move rotationally around the pivot point 753 through a movement path 771. In order to load dishes onto the dishwashing apparatus, initially, the dish lifting mechanism raises the top dish of a stack through a gap 711, then the arm 758 engages with the top dish and moves through the movement path 771 to load the dish onto the dishwashing apparatus.

As shown in FIG. 13C, a dish is held in three points by the arm mechanism. An extension assembly comprising an extension arm 761 with a gripper 762 at the end supports the rim/lip of the dish at the point closest to the pivot point 753. The sides of the dish are supported by two side grippers 763 on telescopic arms 764 which extend from structure holes in the telescopic arms 759 that couple to the arms 758 attached to the pivot points 753.

The arm assembly is moved by a cable 767 as shown in FIG. 13D. The cable 767 is attached to each end of the curved rib 754, and the cable is also looped around a spindle attached to the motor 757 mounted on the support arm 751. When the motor 757 causes the spindle to rotate, the arm assembly moves rotationally around the pivot 753.

FIG. 13E shows the arm assembly in an upright position in which a dish is loaded onto the dishwashing apparatus. As illustrated in FIG. 13E, the dish is gripped at three gripping points 770. Once the dish is engaged by the threaded rods of the dishwashing apparatus, the dish is released at the three gripping points 770 and the arm assembly moves back through a return path 772 to load the next dish.

FIGS. 14A to 14D show views of a dish unloading system according to an embodiment of the present invention. The system may form a compact dish unloading unit 800 as shown in FIGS. 14A and 14B. The compact dish unloading unit 800 comprises a base portion 801 with two guide plates 802 which support a platform 803. The vertical position of the platform can be changed by an elevator mechanism 804. The base portion 801 and guide plates of the compact dish unloading unit 800 may be configured in an analogous manner to corresponding parts of the compact loading system 700 shown in FIGS. 13A and 13B.

The elevator mechanism 804 is configured to adjust the elevation height of the platform 803 according to the number of dishes loaded on the platform 803. Thus, as dishes are loaded on to the platform 803, the elevation mechanism 804 moves the platform downwards in a vertical direction such that the upper surface of the stack of dishes on the platform is maintained in an effectively constant position, thereby allowing further dishes to be unloaded to approximately the same position. Thus, when dishes are unloaded, the distance though which they are moved does not change for different heights of the stack of unloaded dishes.

The compact dish unloading system 800 comprises an unloading arm system which unloads dishes 621 from the dishwashing apparatus 450 and stacks the dishes 621 on the platform 803. The unloading arm system 850 comprises a pair of first extension arms 851 that are mounted on symmetry arms 860 of the assembly 450. The symmetry arms 860 are coupled to the bottom pair of rods of the dishwashing apparatus. As shown in FIG. 14B, the first extension arms 851 extend from the end of the dishwashing apparatus parallel to the axis of the rods. Each of the first extension arms 851 has an operating channel 852 which is a slit running substantially along the length of the first extension arms 851. A second pair of extension arms 854 is respectively coupled to the first extension arms 851. Motors 853 located at one end of the second extension arms 852 are configured to move the ends of the second extension arms 854 along the operating channels 852 in the first extension arms 851. Further, a pair of gear systems 859 respectively control the rotational position of the second extension arms 854 relative to the first extension arms 851.

The second extension arms 854 each have respective gripper channels 855 which are slits running substantially along the length of the second extension arms 854. Gripper extensions 856 are arranged in the gripper channels 855. The gripper extensions 856 have grippers 861 attached to their ends which are configured to grip the rim of the dish 621 which is unloaded from the dishwashing apparatus.

A centre shaft 857 extends from the pivot point of one of the second extension arms 854 with the corresponding first extension arm 852. The centre shaft 857 extends into the gap between the pair of first extension arms 852. A centre extension portion 858 is attached to the end of the centre shaft 857. In the configuration shown in FIG. 14A, the centre extension portion 858 has a support gripper 862 attached to the end which is configured to support the rim of the dish 621 as the dish is unloaded from the dishwashing apparatus.

The process of unloading a dish from the dishwashing apparatus will now be described with reference to FIGS. 14C and 14D. As shown in FIG. 14C, the grippers 861 move to an engagement position and engage with the upper lip/rim of a dish 621 which is in a vertical position having moved to the end of the threaded parts of the three rods. The support gripper 862 attached to the centre extension 858 engages with a lower end portion of the lip/rim of dish 621.

Then, the gear 859 and motor 853 systems move the pair of second extension arms 854 along the respective operating channels 852. The gear 859 and motor 853 systems then cause the second pair of extension arms 854 to rotate such that the dish 621 moves to a horizontal position for unloading as shown in FIG. 14D. The dish is then released by the grippers 861 and the support controller 862, and placed onto the platform 803 (or the top of a stack of dishes on the platform 803). Then, the platform moves downward 805 so that the next dish can be unloaded and placed on top of the stack.

The unloading of dishes in the manner described above has the advantage that the unloaded dishes are stacked facing upwards which allows for easy further processing of the dishes.

Figure 15:
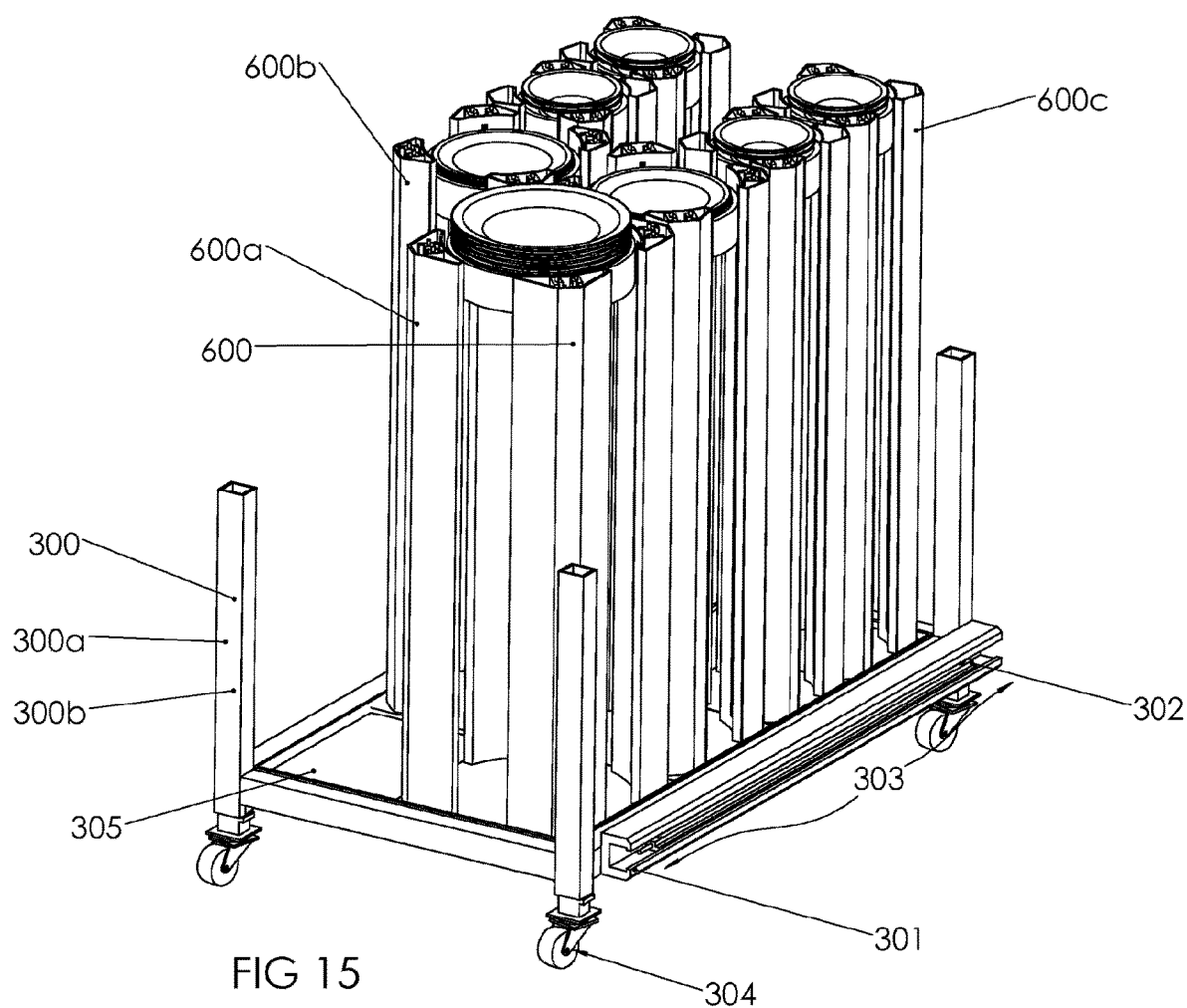
FIG. 15 shows a trolley for use in a dishwashing system according to an embodiment of the present invention.

FIG. 15 shows a trolley for use in a dishwashing system according to an embodiment of the present invention. As shown in FIG. 15, the trolley 300 organizes the dishes according to their size (i.e. the diameter of the rim/lip of the dish). The trolley 300 may be used to store and organize dishes to be loaded onto the dishwashing apparatus (e.g. trolley 300a) or for storing dishes which are unloaded from the dishwasher apparatus (e.g. trolley 300b).

The trolley 300 comprises a frame, caster wheels 304 and a base 305. A control and driving assembly 301 is located on the side of the trolley 300. The control and driving assembly allows the position of the trolley 300 relative to the dishwashing apparatus to be controlled. This allows dishes to be loaded or unloaded from the trolley 300. The control and driving assembly 301 comprises a position sensor 302 which detect the location of the trolley relative to the dishwashing system. The trolley 300 may be moved in along the direction 303 of the control and driving assembly 301 by the dishwashing apparatus.

Movement of the trolley allows the collaborative robotic arm 200a or 200b to do minimal work by ensuring that the dishes are moved from or to substantially the same position on the trolley in the 303 direction when the trolley is adjacent to the dishwashing apparatus as shown in FIG. 2A to 2D.

A plurality of plate cart assemblies 600 are positioned on the base of the trolley 305. The plate cart assemblies allow the dishes to be arranged into stacks according to their size for loading and/or unloading. As shown in FIG. 15, the plate cart assemblies include large sized plate cart assemblies 600a, medium sized plate cart assemblies 600b, and small sized plate cart assemblies 600c, for holding large, medium and small sized dishes respectively.

Figure 16:
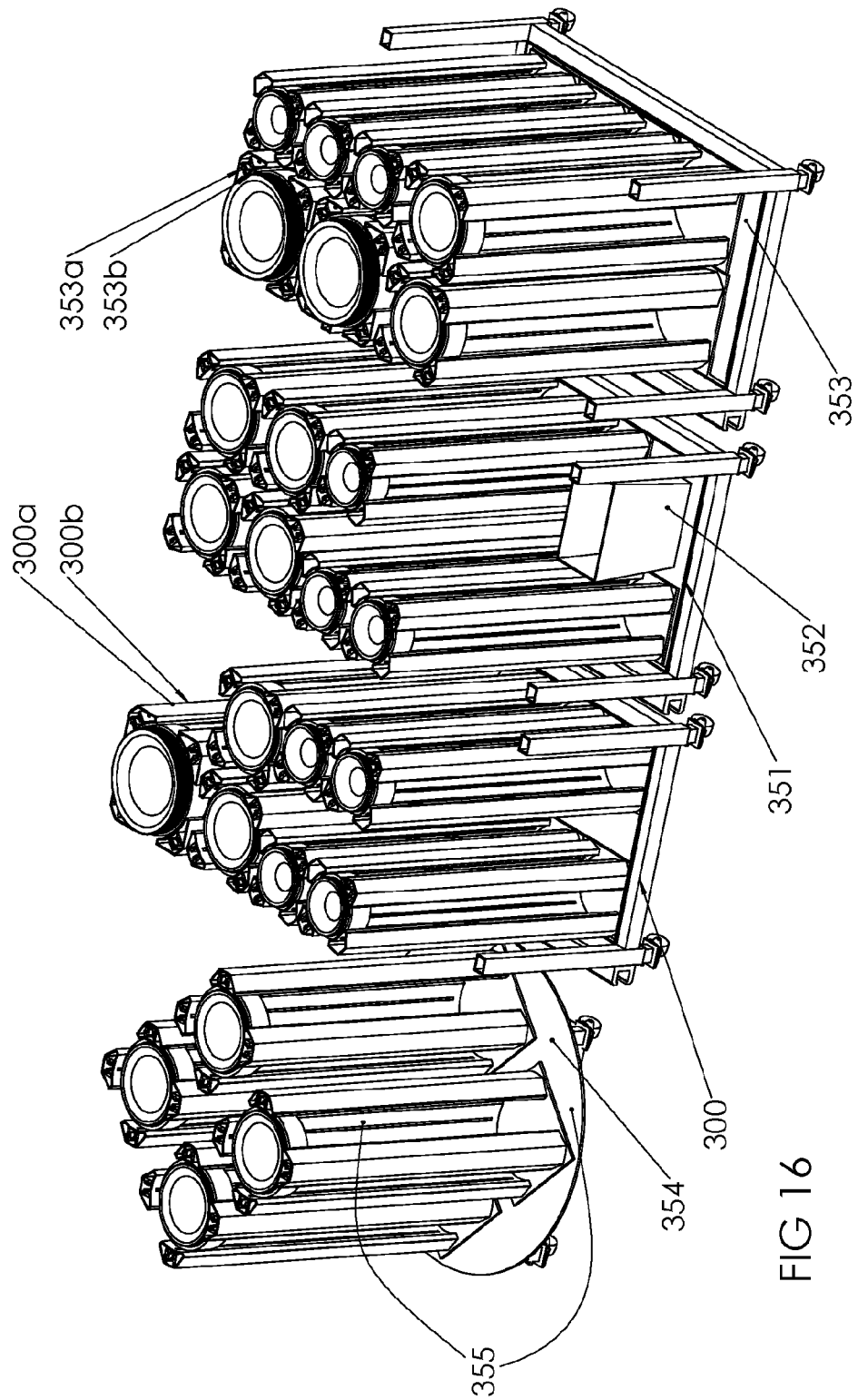
FIG. 16 shows various trolleys for use in a dishwashing system according to an embodiment of the present invention.

FIG. 16 shows examples of trolleys for use in a dishwashing system according to an embodiment of the present invention.

In one example the trolley 354 has a circular base and can be rotated circularly 355 about its central axis. The plate cart assembles may be arranged in according to different plate cart layouts 353. For example, for a trolley 300a may have a layout 353a for dirty plates and a trolley 300b may have a layout 353b for clean plates. The trolley may include attachment space 351 for attachments other than plate cart assemblies. This attachment space 351 may contain a wastage collection container 352 for collecting waste from dirty plates and dishes.

Figure 17:
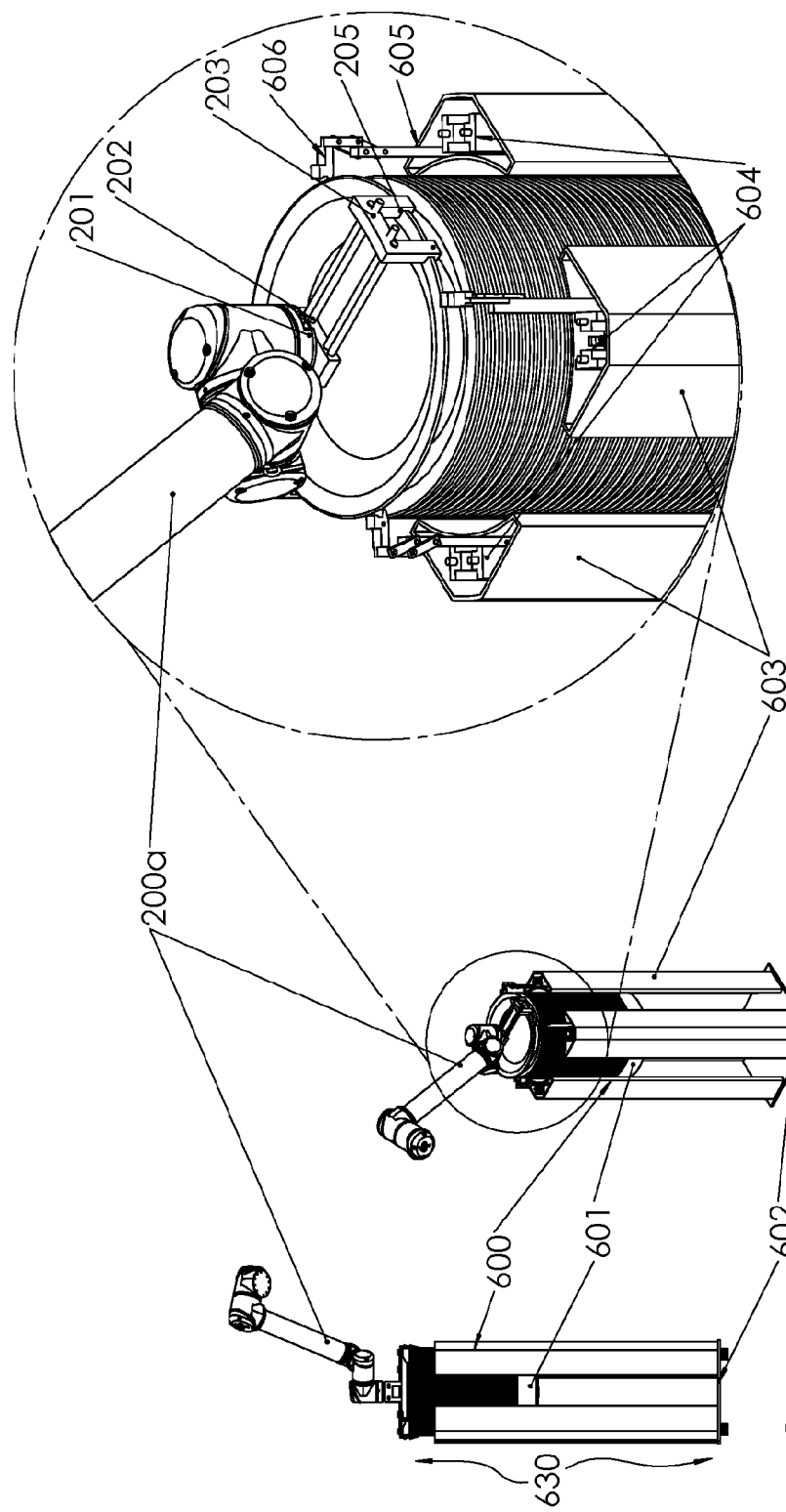
FIGS. 17A to 17C show details of a dish lifting mechanism of a dish cart assembly and movement of a dish by a robotic arm in a system according to an embodiment of the present invention unit according to an embodiment of the present invention.

FIG. 17A to 17C show details of a dish lifting mechanism of a dish cart assembly unit and movement of the dish by a robotic arm in a system according to an embodiment of the present invention.

The dish cart unit 600 comprises a base 602 and four pillar supports 603 arranged at equal distances from the center of the base 602. Located within the four pillar supports 603 is a dish support base 601 that is movable in a vertical direction 630 from a lower position at the base of the pillar supports to an upper most position at the top of the pillar supports. The vertical position of the dish base support can be changed by an elevator mechanism.

As shown in FIGS. 17A and 17B, the movement of the dish support base 601 allows the position of the top dish in a stack of dishes to be controlled. Thus, the top dish can be moved to a position for loading by a robotic arm 200a.

As shown in FIG. 17C, the top of each of the pillar supports 603 comprises a dish lifting mechanism which lifts the top dish of the stack of dishes so that it can be easily gripped by the robotic arm 200a. The dish lifting mechanism comprises a driver portion 604 which is located inside each of the pillar supports 603. A lifting arm 605 extends upwards from the driver portion 604. A dish engagement foot 606 is located at the end of each of the lifting arms 605.

The driver portion 604 can cause the lifting arms 605 to move upwards out of the support pillars 603, thus when the dish engagement foot 606 contacts the rim of a dish, the dish is lifted upwards from the top of the stack.

When the dish is lifted upwards, it can be gripped by a dish engagement portion 201 at the end of the robotic arm 200a. The dish engagement portion 201 of the robotic arm 200a comprises a dish gripper extension 202 and a dish gripper 203. The dish gripper 203 has recesses 205 which are shaped to receive the rim of a dish. As shown in FIG. 17C, the dish gripper extension 202 allows the dish gripper 203 to be moved to a position in which the rim of the upper-most dish engages with the recesses 205. Thus, the upper-most dish can be lifted from the stack and loaded onto the dishwashing apparatus.

In the dishing washing and drying apparatus described above, dishes having a circular rim or lip may be washed and dried. In order to allow other items such as cutlery and utensils and non-circular shaped dishes to be washed and/or dried in the apparatus, the cage assembly described below with reference to FIG. 18 and the dish holders described below with reference to FIGS. 19A to 19C may be used.

FIG. 18 shows a cutlery and utensil cage assembly with a circular lip/rim for use in a dishwashing system according to an embodiment of the present invention. As shown in FIG. 18, the cutlery and utensil cage assembly 650 comprises a plurality of rings 651 spaced along a plurality of reinforcing rods 652 to form a cage having a cylinder shape. A mesh including an end grid 654 surrounds the internal portion of the cage framework defining a cavity 656 within which utensils can be placed. The cutlery utensil cage assembly 650 includes an opening 655 that allows access to the internal cavity 656.

In use, the cutlery and utensil cage assembly 650 is loaded onto a dishwasher assembly in a similar fashion as dishes except that instead of engaging with the lip/rim of the dish the threads on the rods of the dishwashing apparatus engages with the lip/rims of the plurality of rings 651 arranged on the outer surface of the cutlery and utensil cage assembly 650. Accordingly, the cutlery and utensil cage assembly 650 is then caused to move through the dishwashing apparatus and rotates as it passes through a target zone of a spray nozzle.

FIGS. 19A to 19C show dish holder devices for use in a dishwashing system according to an embodiment of the present invention.

As shown in FIG. 19A an irregular shaped dish 659 is attached to a dish holder device 658. The dish holder device 658 has a circular rim 657 which engages with the thread on the rods of the dishwashing apparatus and thus allows the irregular shaped dish to be washed in the dishwashing apparatus described above.

FIGS. 19B and 19C show examples of a dish holder device 658 which comprises a frame which grips dishes allowing them to be washed in dishwashing apparatus described above. In each case the dish holder 658 device has a circular rim 657 which engages with the thread on the rods of the dishwashing apparatus and thus allows the irregular shaped dish to be washed in the dishwashing apparatus described above. As shown in FIG. 19B, a rectangular dish 660 is held by the frame of the dish holder 658 and as shown in FIG. 19C an oval dish 661 is held by the frame of the dish holder device 658.

Figure 20:
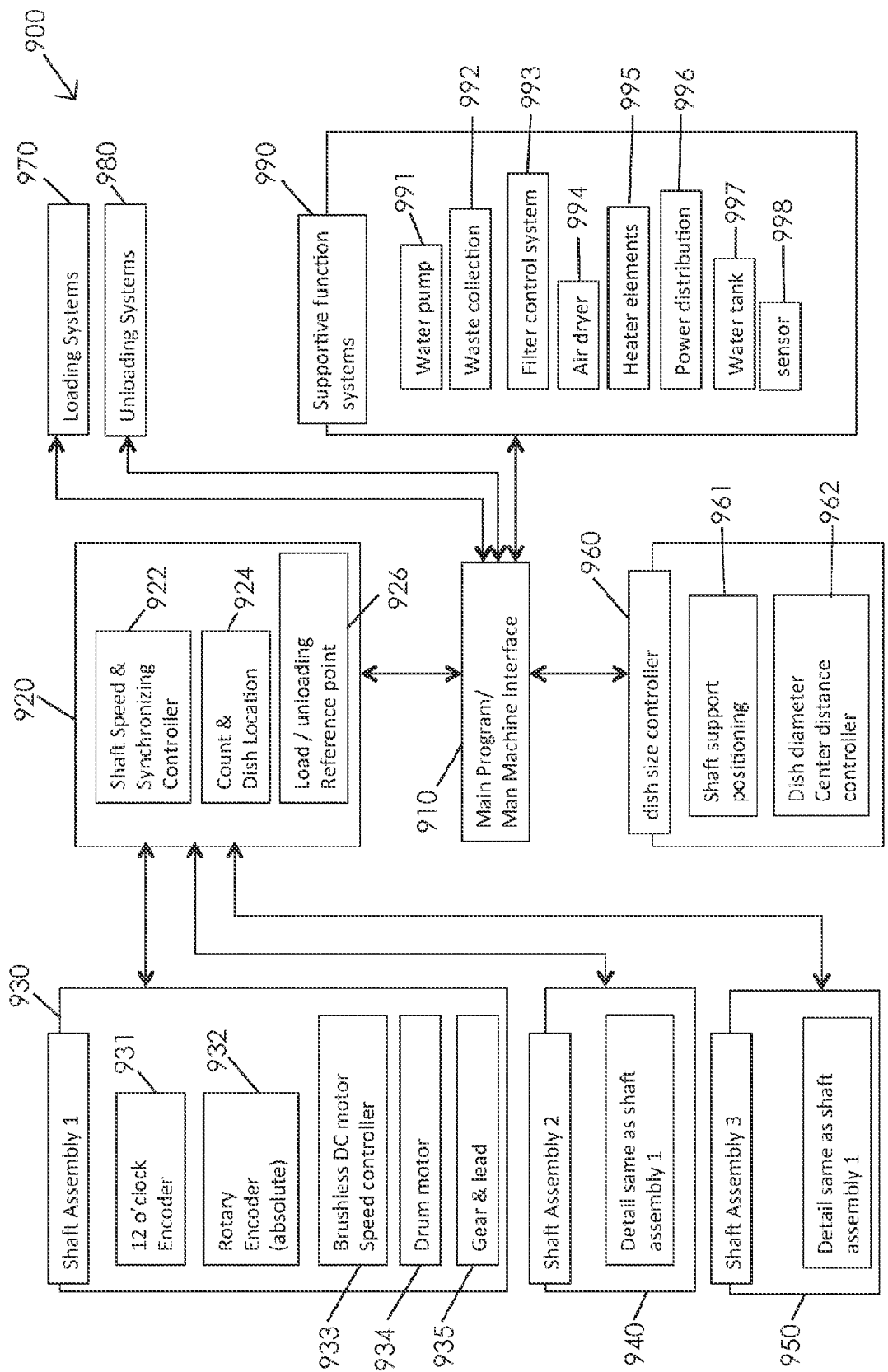
FIG. 20 is a block diagram showing the control system of a dishwashing system according to an embodiment of the present invention.

FIG. 20 is a block diagram showing the control system of a dishwashing system according to an embodiment of the present invention. As shown in FIG. 20, the control system 900 comprises a main program 910 which runs on a central processing unit (CPU) located in the control interface 102 described above. The control system 900 further comprises a shaft rotation sensing and control module 920. The shaft rotation sensing and control module 920 comprises a shaft speed and synchronizing controller 922, a dish count and location sensing module 924 and a load/unloading reference point module 926. The shaft rotation sensing and control module 920 is coupled to sensing and control modules of the first shaft assembly 930, the second shaft assembly 940 and the third shaft assembly 950. The first shaft assembly 930 comprises a 12 o'clock encoder 931 which is configured to count rotations of the first rod 14 of the dishwashing apparatus 10; an absolute rotary encoder 932 which is configured to determine the rotational position of the first rod 14 of the dishwashing apparatus; a speed controller 933 for the drum motor 934 that drives the first rod 14; the drum motor 934 itself; and gearing and leads 935 coupled to the drum motor 934. The second shaft assembly 940 and the third shaft assembly 950 are configured in an analogous manner to the first shaft assembly 930 and so the descriptions are omitted.

The control system 900 further comprises a dish size controller 960. The dish size controller 960 comprises a shaft support positioning system 961 comprising the motors that adjust the positions of the rods to allow different sized dishes to be received in the dishwashing apparatus, and a dish diameter center distance controller 962 which controls the shaft support positioning system 962.

The control system 900 further comprises loading systems 970 and unloading systems 980 which may comprise robotic arms or loading/unloading systems as described above with reference to FIGS. 10A to 10D, 11A to 11B, 13A to 13E, and 14A to 14D.

The control system 900 further comprises supportive function systems 990. The supportive function systems comprise water pump systems 991, waste collection systems 992, a filter control system 993, an air dryer 994, heating elements 995, power distribution 996, the water tank controller 997 and various sensors 998 which may include temperature sensors, water/liquid level sensors, proximity sensors etc.

In use, the shaft rotation sensing and control module 920 receives signals from each of the shaft assemblies and controls the motor speed controllers of each if the shaft assemblies such that rotational position of the three rods is aligned, this ensures that dishes are engaged by the threads on the three rods at substantially the same time. The dish count and location sensing module 924 determines the count and location of dishes on the apparatus, this may be through sensors located in the system that determine the locations of dishes in the system.

The main program 910 may use sensed data from trolleys to determine that a change in position of the rods is required to accommodate a different dish size. Then once it has been determined that there are no longer dishes within the apparatus, for example by sensing the number of dishes loaded onto the apparatus and counting the number of unloaded dishes, the dish size controller 960, causes the position of the rods to be adjusted to accommodate the new dish size.

The loading system 970 may also be controlled according to the dish type to adjust the spacing of dishes as described above in relation to FIGS. 7A to 7C.

The supporting system functioning 990 may also be controlled according to the sensed position of dishes within the apparatus, for example, if there are a sequence of operational zones, these may be initiated once dishes have entered that specific zone. For this control the position of dishes within the apparatus may be sensed using sensors or may be calculated from the rotational speed of the rods.

In the embodiments described above, the lower two rods are arranged at the same vertical height and there is a single upper rod. In some embodiments, there is a single lower rod and two upper rods. Such an embodiment is described below with reference to FIGS. 21A to 21C.

Figures 21B, 21C:
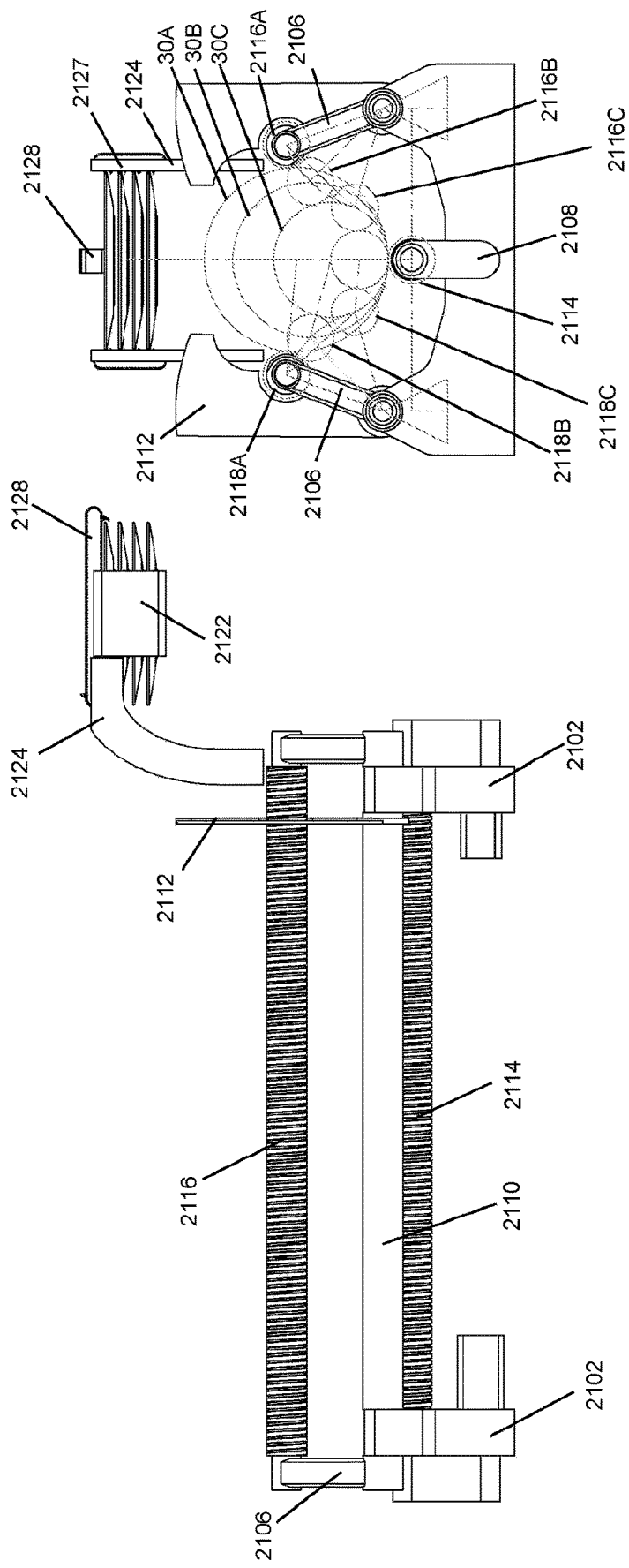

FIGS. 21A to 21C show dishwashing apparatus according to an embodiment of the present invention. FIG. 21A is a perspective view, FIG. 21B is a side on view and FIG. 21C is an end on view. FIG. 21C also shows positions of the rods of the dishwashing apparatus which are movable to accommodate different dish sizes.

In this embodiment, the dishwashing apparatus 2100 comprises a first rod 2114, a second rod 2116 and a third rod 2118. As described above, each of the first rod 2114, the second rod 2116 and the third rod 2118 are provided with a screw thread 20 on an outer surface. Each rod is rotatable about a respective longitudinal axis. The first rod 2114, second rod 2116, and the third rod 2118 are arranged in a parallel configuration, at equal distances from a central axis. When the first rod 2114, second rod 2116, and the third rod 2118 are rotated about their respective axes, dishes are caused to move relative to a spray nozzle in the direction of the central axis and rotate as the pass through a target zone. In this embodiment, the first rod 2114 is arranged as a lower rod, the position of which is not movable, and the second rod 2116 and the third rod 2118 are arranged as upper rods each occupying a position higher than the first rod 2114.

The dishwashing apparatus 2100 is mounted on two base portions 2102 which are arranged at opposing ends of the dishwashing apparatus 2100. The two base portions 2102 have raised pivot points 2104 at each side and cutaway portion in the center. Movable arms 2106 are attached to the pivot portions 2104. A fixed arm 2108 is attached at the center of the cutaway portion of each base portion 2102. The fixed arms 2108 support the first rod 2114. Each end of the first rod 2114 is attached to one of the fixed arms 2108. The movable arms 2106 on one side of the based portions 2102 support the second rod 2116 and the movable arms on the opposite side of the base portions 2102 support the third rod 2118. Two shafts 2110 run between the two base portions 2102 between the pivot points 2102 parallel to the first rod 2114, the second rod 2116 and the third rod 2118. The movable arms 2106 are coupled to the shafts 2110 so that when the shafts 2110 turn in the pivot points 2104, the movable arms 2106 also move around the pivot points 2106 such that the second rod 2116 and the third rod 2118 move closer together or further apart.

Baffles 2112 are mounted on the shafts 2110 such that the baffles can be moved together and further apart with the second rod 2116 and the third rod 2118.

A loading system 2120 is provided at one end of the dishwashing apparatus 2100. The loading system 2120 comprises a pair of belts 2122 which are provided with fins that support dishes 30 to be cleaned. Movement of the belts 2122 causes the dishes 30 to move upwards. A pair of guides 2124 are provided with grooves 2126 which receive the rim or lip of the dishes 30 and are curved such the dishes 30 are guided from a horizontal position to a vertical position by following the grooves 2126. An actuator 2128 acts to push the dishes 30 from a position supported by the fins of the belts 2122 into the grooves 2122.

As described above in relation to FIG. 1, once a dish is placed in a vertical position between the rods, the rotation of the rods causes the dish to move in a horizontal direction parallel to the rods through a cleaning and/or drying zone.

FIG. 21C shows different possible positions of the movable arms 2106 to accommodate different sizes of dish. As shown in FIG. 21C, with the movable arms 2106 in a first position, the second rod is in a first position 2116A and the third rod is in a first position 2118A this accommodates a large dish size 30A. To accommodate a medium dish size 30B, the movable arms 2106 can be moved inwards such the second rod is in a second position 2116B and the third rod is in a second position 2118B. To accommodate a small dish size 30C, the movable arms 2106 can be moved to a third position in which the second rod is in a third position 2116C and the third rod is in a third position 2118C.

When the movable arms 2106 are moved, the baffles 2112 are also moved such that gap between the baffles 2112 accommodates the dishes being washed/dried. Further, the positions of the belts 2122 and guides 2124 of the loading system 2120 are also movable to accommodate different dish sizes. In this embodiment, the position of the first rod 2108 is not movable.

Whilst the foregoing description has described exemplary embodiments, it will be understood by those skilled in the art that many variations of the embodiments can be made within the scope and spirit of the present invention.

For example, while in the embodiments described above there are three rods which are each threaded to move dishes through the dishwashing apparatus, those of skill in the art will appreciate that four or more rods may be used in an analogous manner.

The invention claimed is:

1. A dishwashing apparatus for washing dishes having a circular rim or lip, the dishwashing apparatus comprising:
    a spray nozzle configured to spray a liquid onto a target zone;
    a first rod; a second rod; and a third rod;
    a robotic loading arm; and
    a controller,
    the first rod, second rod and third rod each having a screw thread on an outer surface and each being rotatable about a respective longitudinal axis; the first rod, second rod and third rod being arranged in a parallel configuration, at equal distances from a central axis,
    wherein the separation of each of the first rod, second rod and third rod from the central axis is configured to receive a plurality of dishes such that the screw thread on each of the rods engages with the circular rim or lip of the dishes and when the rods are rotated about their respective axes, the dishes move relative to the spray nozzle in the direction of the central axis and rotate as they pass through the target zone, wherein each of the first rod, the second rod, and the third rod is provided with a respective non-threaded portion at a loading end of the dishwashing apparatus;

wherein an end of the screw thread on each respective rod is provided with an engagement portion in which the screw thread has a cut away segment adjacent to the respective non-threaded portion, wherein the controller is configured to control the robotic loading arm to load dishes onto the apparatus by aligning the circular rim or lip of a dish with the respective non-threaded portions of each of the first rod, the second rod and the third rod such that the end of the screw thread on each respective rod engages with the circular rim or lip of the dish.

2. The dishwashing apparatus according to claim 1, further comprising a position adjustment system coupled to the first, second, and third rods wherein the position adjustment system is configured to adjust the relative positioning of the respective rods to allow the rods to engage with the rim or lip of a dish of a specific diameter.

3. A dishwashing system comprising the dishwashing apparatus according to claim 1, wherein the dishwashing apparatus is configured to subject dishes to a plurality of treatments, each of the treatments being applied in a respective treatment one, wherein the first, second and thirds rods move dishes through each of the treatment zones.

4. A dishwashing system according to claim 3, wherein the central axis of the dishwashing apparatus is arranged at an angle to a horizontal direction such that the loading end of the loading end of the dishwashing apparatus is lower than an unloading end of the dishwashing apparatus.

5. A dishwashing system according to claim 3, further comprising a baffle device arranged to reduce water flow between a respective pair of treatment zones.

6. A dishwashing system according to claim 3, wherein one of the treatment zones comprises a drying zone having:
an air outlet configured to direct air onto a target zone.

7. A dishwashing system according to claim 5, wherein the baffle device comprises a plurality of plates arranged to slide relative each other: the plurality of plates arranged to provide an aperture having a size which is adjustable depending on a relative positioning of the first, second, and third rods.

8. A dishwashing system according to claim 7, further comprising a position adjustment system coupled to the first, second, and third rods configured to adjust the relative positioning of the respective rods to allow the rods to engage with the rim or lip of a dish of a specific diameter, wherein the position adjustment system is configured to control the relative positioning of the plurality of plates.

9. A dishwashing system comprising a plurality of dishwashing apparatuses according to claim 1.

10. A dishwashing system comprising a first dishwashing apparatus according to claim 1 in which the separation of the rods is fixed and a second dishwashing apparatus comprising a position adjustment system coupled to the first, second and third rods configured to adjust the relative positioning of the respective rods to allow the rods to engage with the rim or lip of a dish of a specific diameter.

11. A dishwashing system according to claim 3, further comprising a unloading system, for unloading dishes from the dishwasher apparatus.

12. A dishwashing system according to claim 11 wherein the unloading system comprises a knockdown device or a cooperative robotic arm.

13. A dishwashing system according to claim 3, further comprising a trolley for storing dishes, the trolley configured to store dishes sorted according to a lip or rim diameter.

14. A dishwashing system according to claim 3, further comprising a holder configured to hold dishes, the holder comprising a circular ring configured to engage with the screw thread.

15. A dishwashing system according to claim 3, further comprising a cage assembly comprising a plurality of rings configured to engage with the screw thread.

16. A dish drying apparatus for drying dishes having a circular rim or lip, the dish drying apparatus comprising:
an air outlet configured to direct air onto a target zone;
a first rod; a second rod; and a third rod;
a robotic loading arm; and
a controller,
the first rod, second rod and third rod each having a screw thread on an outer surface and each being rotatable about a respective longitudinal axis; the first rod, second rod and third rod being arranged in a parallel configuration, at equal distances from a central axis,
wherein the separation of each of the first rod, second rod and third rod from the central axis is configured to receive a plurality of dishes such that the screw thread on each of the rods engages with the circular rim or lip of the dishes and when the rods are rotated about their respective axes, the dishes move relative to the air outlet in the direction of the central axis and rotate as they pass through the target zone,
wherein each of the first rod, the second rod, and the third rod is provided with a respective non-threaded portion at a loading end of the dish drying apparatus;
wherein an end of the screw thread on each respective rod is provide with an engagement portion in which the screw thread has a cut away segment adjacent to the respective non-threaded portion,
wherein the controller is configured to control the robotic loading arm to load dishes onto the apparatus by aligning the circular rim or lip of a dish with the respective non-threaded portions of each of the first rod, the second rod and the third rod such that the end of the screw thread on each respective rod engages with the circular rim or lip of the dish.

\* \* \* \* \*